(12) United States Patent
Boykin

(10) Patent No.: US 10,152,858 B2
(45) Date of Patent: Dec. 11, 2018

(54) SYSTEMS, APPARATUSES AND METHODS FOR TRIGGERING ACTIONS BASED ON DATA CAPTURE AND CHARACTERIZATION

(71) Applicant: COBAN Technologies, Inc., Houston, TX (US)

(72) Inventor: Terry W. Boykin, Katy, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

(21) Appl. No.: 15/413,205

(22) Filed: Jan. 23, 2017

(65) Prior Publication Data

US 2017/0323540 A1    Nov. 9, 2017

Related U.S. Application Data

(60) Provisional application No. 62/333,818, filed on May 9, 2016.

(51) Int. Cl.
*G06K 9/00* (2006.01)
*G08B 13/196* (2006.01)
(Continued)

(52) U.S. Cl.
CPC ....... *G08B 13/19613* (2013.01); *G06F 3/165* (2013.01); *G06K 9/00771* (2013.01); *G08B 13/19621* (2013.01); *G08B 13/19641* (2013.01); *G08B 13/19656* (2013.01); *G11B 20/10527* (2013.01); *G11B 27/10* (2013.01); *H04N 1/00* (2013.01); *H04N 5/2251* (2013.01); *H04N 5/232* (2013.01); *H04N 21/2368* (2013.01); *H04N 21/2743* (2013.01); *H04N 21/4223* (2013.01); *H04N 21/4302* (2013.01);
(Continued)

(58) Field of Classification Search
None
See application file for complete search history.

(56) References Cited

U.S. PATENT DOCUMENTS 4,344,184 A    8/1982  Edwards
4,543,665 A    9/1985  Sotelo et al.
(Continued)

FOREIGN PATENT DOCUMENTS

CN    2907145 Y    5/2007
CN    101309088 A    11/2008
(Continued)

OTHER PUBLICATIONS

Office Action issued in U.S. Appl. No. 11/369,502 dated Mar. 16, 2010, 10 pages.
(Continued)

*Primary Examiner* — Hadi Akhavannik
(74) *Attorney, Agent, or Firm* — JL Salazar Law Firm

(57) ABSTRACT

Systems, apparatuses and methods for triggering actions in response to capturing and characterizing image data. Real-time characterization techniques include object and shape recognition analytics to detect specifically designated content in captured image data. Actions are triggered based upon such detection. Global data access and distribution systems and methods are provided, particularly for use by law enforcement agencies and designated alert systems.

27 Claims, 10 Drawing Sheets

(51) Int. Cl.
*G06F 3/16* (2006.01)
*G11B 20/10* (2006.01)
*G11B 27/10* (2006.01)
*H04N 21/2368* (2011.01)
*H04N 21/2743* (2011.01)
*H04N 21/43* (2011.01)
*H04N 21/435* (2011.01)
*H04N 21/439* (2011.01)
*H04N 21/81* (2011.01)
*H04N 21/84* (2011.01)
*H04N 1/00* (2006.01)
*H04N 5/225* (2006.01)
*H04N 5/232* (2006.01)
*H04N 21/4223* (2011.01)
*H04R 3/00* (2006.01)

(52) U.S. Cl.
CPC ....... *H04N 21/435* (2013.01); *H04N 21/4394* (2013.01); *H04N 21/8106* (2013.01); *H04N 21/84* (2013.01); *H04R 3/005* (2013.01); *G06K 2009/00738* (2013.01); *G11B 2020/10546* (2013.01); *H04S 2400/15* (2013.01)

(56) References Cited

U.S. PATENT DOCUMENTS

| | | | |
|---|---|---|---|
| 4,590,614 | A | 5/1986 | Erat |
| 4,910,795 | A | 3/1990 | McCowen et al. |
| 5,012,335 | A | 4/1991 | Cohodar |
| 5,111,289 | A | 5/1992 | Lucas et al. |
| 5,408,330 | A | 4/1995 | Squicciarini et al. |
| 5,477,397 | A | 12/1995 | Naimpally et al. |
| 5,613,032 | A | 3/1997 | Cruz et al. |
| 5,724,475 | A | 3/1998 | Kirsten |
| 5,815,093 | A | 9/1998 | Kikinis |
| 5,841,978 | A | 11/1998 | Rhoads |
| 5,862,260 | A | 1/1999 | Rhoads |
| 5,926,218 | A | 7/1999 | Smith |
| 5,946,343 | A | 8/1999 | Schotz et al. |
| 5,970,098 | A | 10/1999 | Herzberg |
| 6,002,326 | A | 12/1999 | Turner |
| 6,009,229 | A | 12/1999 | Kawamura |
| 6,028,528 | A | 2/2000 | Lorenzetti et al. |
| 6,038,257 | A | 3/2000 | Brusewitz et al. |
| 6,122,403 | A | 9/2000 | Rhoads |
| 6,141,611 | A | 10/2000 | Mackey et al. |
| 6,163,338 | A | 12/2000 | Johnson et al. |
| 6,175,860 | B1 | 1/2001 | Gaucher |
| 6,181,711 | B1 | 1/2001 | Zhang et al. |
| 6,275,773 | B1 | 8/2001 | Lemelson et al. |
| 6,298,290 | B1 | 10/2001 | Abe et al. |
| 6,346,965 | B1 | 2/2002 | Toh |
| 6,405,112 | B1 | 6/2002 | Rayner |
| 6,411,874 | B2 | 6/2002 | Morgan et al. |
| 6,421,080 | B1 | 7/2002 | Lambert |
| 6,424,820 | B1 | 7/2002 | Burdick et al. |
| 6,462,778 | B1 | 10/2002 | Abram et al. |
| 6,505,160 | B1 | 1/2003 | Levy et al. |
| 6,510,177 | B1 | 1/2003 | De Bonet et al. |
| 6,518,881 | B2 | 2/2003 | Monroe |
| 6,624,611 | B2 | 9/2003 | Kirmuss |
| 6,778,814 | B2 | 8/2004 | Koike |
| 6,788,338 | B1 | 9/2004 | Dinev et al. |
| 6,788,983 | B2 | 9/2004 | Zheng |
| 6,789,030 | B1 | 9/2004 | Coyle et al. |
| 6,791,922 | B2 | 9/2004 | Suzuki |
| 6,825,780 | B2 | 11/2004 | Saunders et al. |
| 6,831,556 | B1 | 12/2004 | Boykin |
| 7,010,328 | B2 | 3/2006 | Kawasaki et al. |
| 7,091,851 | B2 | 8/2006 | Mason et al. |
| 7,119,832 | B2 | 10/2006 | Blanco et al. |
| 7,120,477 | B2 | 10/2006 | Huang |
| 7,155,615 | B1 | 12/2006 | Silvester |
| 7,167,519 | B2 | 1/2007 | Comaniciu et al. |
| 7,190,882 | B2 | 3/2007 | Gammenthaler |
| 7,231,233 | B2 | 6/2007 | Gosieski, Jr. |
| 7,272,179 | B2 | 9/2007 | Siemens et al. |
| 7,317,837 | B2 | 1/2008 | Yatabe et al. |
| 7,356,473 | B2 | 4/2008 | Kates |
| 7,386,219 | B2 | 6/2008 | Ishige |
| 7,410,371 | B2 | 8/2008 | Shabtai et al. |
| 7,414,587 | B2 | 8/2008 | Stanton |
| 7,428,314 | B2 | 9/2008 | Henson |
| 7,515,760 | B2 | 4/2009 | Sai et al. |
| 7,542,813 | B2 | 6/2009 | Nam |
| 7,551,894 | B2 | 6/2009 | Gerber et al. |
| 7,554,587 | B2 | 6/2009 | Shizukuishi |
| 7,618,260 | B2 | 11/2009 | Daniel et al. |
| 7,631,195 | B1 | 12/2009 | Yu et al. |
| 7,688,203 | B2 | 3/2010 | Rockefeller et al. |
| 7,693,289 | B2 | 4/2010 | Stathem et al. |
| 7,768,548 | B2 | 8/2010 | Silvernail et al. |
| 7,778,601 | B2 | 8/2010 | Seshadri et al. |
| 7,792,189 | B2 | 9/2010 | Finizio et al. |
| 7,818,078 | B2 | 10/2010 | Iriarte |
| 7,835,530 | B2 | 11/2010 | Avigni |
| 7,868,912 | B2 | 1/2011 | Venetianer et al. |
| 7,877,115 | B2 | 1/2011 | Seshadri et al. |
| 7,974,429 | B2 | 7/2011 | Tsai |
| 7,995,652 | B2 | 8/2011 | Washington |
| 8,068,023 | B2 | 11/2011 | Dulin et al. |
| 8,081,214 | B2 | 12/2011 | Vanman et al. |
| 8,086,277 | B2 | 12/2011 | Ganley et al. |
| 8,121,306 | B2 | 2/2012 | Cilia et al. |
| 8,126,276 | B2 | 2/2012 | Bolle et al. |
| 8,126,968 | B2 | 2/2012 | Rodman et al. |
| 8,139,796 | B2 | 3/2012 | Nakashima et al. |
| 8,144,892 | B2 | 3/2012 | Shemesh et al. |
| 8,145,134 | B2 | 3/2012 | Henry et al. |
| 8,150,089 | B2 | 4/2012 | Segawa et al. |
| 8,154,666 | B2 | 4/2012 | Mody |
| 8,166,220 | B2 | 4/2012 | Ben Yacov et al. |
| 8,174,577 | B2 | 5/2012 | Chou |
| 8,195,145 | B2 | 6/2012 | Angelhag |
| 8,208,024 | B2 | 6/2012 | Dischinger |
| 8,228,364 | B2 | 7/2012 | Cilia |
| 8,230,149 | B1 | 7/2012 | Long et al. |
| 8,253,796 | B2 | 8/2012 | Renkis |
| 8,254,844 | B2 | 8/2012 | Kuffner et al. |
| 8,260,217 | B2 | 9/2012 | Chang et al. |
| 8,264,540 | B2 | 9/2012 | Chang et al. |
| 8,270,647 | B2 | 9/2012 | Crawford et al. |
| 8,289,370 | B2 | 10/2012 | Civanlar et al. |
| 8,300,863 | B2 | 10/2012 | Knudsen et al. |
| 8,311,549 | B2 | 11/2012 | Chang et al. |
| 8,311,983 | B2 | 11/2012 | Guzik |
| 8,358,980 | B2 | 1/2013 | Tajima et al. |
| 8,380,131 | B2 | 2/2013 | Chiang |
| 8,422,944 | B2 | 4/2013 | Flygh et al. |
| 8,446,469 | B2 | 5/2013 | Blanco et al. |
| 8,457,827 | B1 | 6/2013 | Ferguson et al. |
| 8,489,065 | B2 | 7/2013 | Green et al. |
| 8,489,151 | B2 | 7/2013 | Engelen et al. |
| 8,497,940 | B2 | 7/2013 | Green et al. |
| 8,554,145 | B2 | 10/2013 | Fehr |
| 8,612,708 | B2 | 12/2013 | Drosch |
| 8,630,908 | B2 | 1/2014 | Forster |
| 8,661,507 | B1 | 2/2014 | Hesselink et al. |
| 8,707,392 | B2 | 4/2014 | Birtwhistle et al. |
| 8,731,742 | B2 | 5/2014 | Zagorski et al. |
| 8,780,199 | B2 | 7/2014 | Mimar |
| 8,781,292 | B1 | 7/2014 | Ross et al. |
| 8,849,557 | B1 | 9/2014 | Levandowski et al. |
| 9,041,803 | B2 | 5/2015 | Chen et al. |
| 9,070,289 | B2 | 6/2015 | Saund et al. |
| 9,159,371 | B2 | 10/2015 | Ross et al. |
| 9,201,842 | B2 | 12/2015 | Plante |
| 9,225,527 | B1 | 12/2015 | Chang |
| 9,253,452 | B2 | 2/2016 | Ross et al. |
| 9,307,317 | B2 | 4/2016 | Chang et al. |
| 9,325,950 | B2 | 4/2016 | Haler |

(56) References Cited

U.S. PATENT DOCUMENTS

| | | |
|---|---|---|
| 9,471,059 B1 | 10/2016 | Wilkins |
| 9,589,448 B1 | 3/2017 | Schneider et al. |
| 9,665,094 B1 | 5/2017 | Russell |
| 10,074,394 B2 | 9/2018 | Ross et al. |
| 2002/0003571 A1 | 1/2002 | Schofield et al. |
| 2002/0051061 A1 | 5/2002 | Peters et al. |
| 2002/0135679 A1 | 9/2002 | Scaman |
| 2003/0052970 A1 | 3/2003 | Dodds et al. |
| 2003/0080878 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0103140 A1 | 6/2003 | Watkins |
| 2003/0151663 A1 | 8/2003 | Lorenzetti et al. |
| 2003/0197629 A1 | 10/2003 | Saunders et al. |
| 2004/0008255 A1 | 1/2004 | Lewellen |
| 2004/0051793 A1 | 3/2004 | Tecu et al. |
| 2004/0107030 A1 | 6/2004 | Nishira et al. |
| 2004/0146272 A1 | 7/2004 | Kessel et al. |
| 2004/0177253 A1 | 9/2004 | Wu et al. |
| 2005/0007458 A1 | 1/2005 | Benattou |
| 2005/0078195 A1 | 4/2005 | VanWagner |
| 2005/0083404 A1 | 4/2005 | Pierce et al. |
| 2005/0088521 A1 | 4/2005 | Blanco et al. |
| 2005/0122397 A1 | 6/2005 | Henson et al. |
| 2005/0154907 A1 | 7/2005 | Han et al. |
| 2005/0158031 A1 | 7/2005 | David |
| 2005/0185936 A9 | 8/2005 | Lao et al. |
| 2005/0243171 A1 | 11/2005 | Ross, Sr. et al. |
| 2005/0286476 A1 | 12/2005 | Crosswy et al. |
| 2006/0055521 A1 | 3/2006 | Blanco et al. |
| 2006/0072672 A1 | 4/2006 | Holcomb et al. |
| 2006/0077256 A1 | 4/2006 | Silvemail et al. |
| 2006/0078046 A1 | 4/2006 | Lu |
| 2006/0130129 A1 | 6/2006 | Dai et al. |
| 2006/0133476 A1 | 6/2006 | Page et al. |
| 2006/0165386 A1 | 7/2006 | Garoutte |
| 2006/0270465 A1 | 11/2006 | Lee et al. |
| 2006/0274116 A1 | 12/2006 | Wu |
| 2007/0005609 A1 | 1/2007 | Breed |
| 2007/0064108 A1 | 3/2007 | Haler |
| 2007/0086601 A1 | 4/2007 | Mitchler |
| 2007/0111754 A1 | 5/2007 | Marshall et al. |
| 2007/0124292 A1 | 5/2007 | Kirshenbaum et al. |
| 2007/0217761 A1 | 9/2007 | Chen et al. |
| 2007/0219685 A1 | 9/2007 | Plante |
| 2008/0005472 A1 | 1/2008 | Khalidi et al. |
| 2008/0030782 A1 | 2/2008 | Watanabe |
| 2008/0129825 A1 | 6/2008 | DeAngelis et al. |
| 2008/0165250 A1 | 7/2008 | Ekdahl et al. |
| 2008/0186129 A1 | 8/2008 | Fitzgibbon |
| 2008/0208755 A1 | 8/2008 | Malcolm |
| 2008/0294315 A1 | 11/2008 | Breed |
| 2008/0303903 A1 | 12/2008 | Bentley et al. |
| 2009/0017881 A1 | 1/2009 | Madrigal |
| 2009/0022362 A1* | 1/2009 | Gagvani ............... G06T 7/254 |
| | | 382/100 |
| 2009/0074216 A1 | 3/2009 | Bradford et al. |
| 2009/0076636 A1 | 3/2009 | Bradford et al. |
| 2009/0118896 A1 | 5/2009 | Gustafsson |
| 2009/0195651 A1 | 8/2009 | Leonard et al. |
| 2009/0195655 A1 | 8/2009 | Pandey |
| 2009/0213902 A1 | 8/2009 | Jeng |
| 2010/0026809 A1 | 2/2010 | Curry |
| 2010/0030929 A1 | 2/2010 | Ben-Yacov et al. |
| 2010/0057444 A1 | 3/2010 | Cilia |
| 2010/0081466 A1 | 4/2010 | Mao |
| 2010/0131748 A1 | 5/2010 | Lin |
| 2010/0136944 A1 | 6/2010 | Taylor et al. |
| 2010/0180051 A1 | 7/2010 | Harris |
| 2010/0238009 A1 | 9/2010 | Cook et al. |
| 2010/0274816 A1 | 10/2010 | Guzik |
| 2010/0287545 A1 | 11/2010 | Corbetin |
| 2010/0289648 A1 | 11/2010 | Ree |
| 2010/0302979 A1 | 12/2010 | Reunamaki |
| 2010/0309971 A1 | 12/2010 | Vanman et al. |
| 2011/0016256 A1 | 1/2011 | Hatada |
| 2011/0044605 A1 | 2/2011 | Vanman et al. |
| 2011/0092248 A1* | 4/2011 | Evanitsky ........ G08B 13/19621 |
| | | 455/556.1 |
| 2011/0142156 A1 | 6/2011 | Haartsen |
| 2011/0233078 A1 | 9/2011 | Monaco et al. |
| 2011/0234379 A1 | 9/2011 | Lee |
| 2011/0280143 A1 | 11/2011 | Li et al. |
| 2011/0280413 A1 | 11/2011 | Wu et al. |
| 2011/0299457 A1 | 12/2011 | Green, III et al. |
| 2012/0014534 A1 | 1/2012 | Bodley et al. |
| 2012/0078397 A1 | 3/2012 | Lee et al. |
| 2012/0083960 A1 | 4/2012 | Zhu et al. |
| 2012/0119894 A1 | 5/2012 | Pandy |
| 2012/0163309 A1 | 6/2012 | Ma et al. |
| 2012/0173577 A1 | 7/2012 | Millar et al. |
| 2012/0266251 A1 | 10/2012 | Birtwhistle et al. |
| 2012/0300081 A1 | 11/2012 | Kim |
| 2012/0307070 A1 | 12/2012 | Pierce |
| 2012/0310394 A1 | 12/2012 | El-Hoiydi |
| 2012/0310395 A1 | 12/2012 | El-Hoiydi |
| 2013/0114849 A1* | 5/2013 | Pengelly ............... G06F 17/289 |
| | | 382/103 |
| 2013/0135472 A1 | 5/2013 | Wu et al. |
| 2013/0163822 A1* | 6/2013 | Chigos ............... G06K 9/00771 |
| | | 382/105 |
| 2013/0201884 A1 | 8/2013 | Freda et al. |
| 2013/0218427 A1 | 8/2013 | Mukhopadhyay et al. |
| 2013/0223653 A1 | 8/2013 | Chang |
| 2013/0236160 A1 | 9/2013 | Gentile et al. |
| 2013/0242262 A1 | 9/2013 | Lewis |
| 2013/0251173 A1 | 9/2013 | Ejima et al. |
| 2013/0268357 A1 | 10/2013 | Heath |
| 2013/0287261 A1 | 10/2013 | Lee et al. |
| 2013/0302758 A1 | 11/2013 | Wright |
| 2013/0339447 A1 | 12/2013 | Ervine |
| 2013/0346660 A1 | 12/2013 | Kwidzinski et al. |
| 2014/0037142 A1 | 2/2014 | Bhanu et al. |
| 2014/0078304 A1 | 3/2014 | Othmer |
| 2014/0085475 A1 | 3/2014 | Bhanu et al. |
| 2014/0092251 A1 | 4/2014 | Troxel |
| 2014/0100891 A1 | 4/2014 | Turner et al. |
| 2014/0114691 A1 | 4/2014 | Pearce |
| 2014/0143545 A1 | 5/2014 | McKeeman et al. |
| 2014/0162598 A1 | 6/2014 | Villa-Real |
| 2014/0184796 A1 | 7/2014 | Klein et al. |
| 2014/0236414 A1 | 8/2014 | Droz et al. |
| 2014/0236472 A1 | 8/2014 | Rosario |
| 2014/0278052 A1 | 9/2014 | Slavin et al. |
| 2014/0280584 A1 | 9/2014 | Ervine |
| 2014/0281498 A1 | 9/2014 | Bransom et al. |
| 2014/0297687 A1 | 10/2014 | Lin |
| 2014/0309849 A1 | 10/2014 | Ricci |
| 2014/0321702 A1* | 10/2014 | Schmalstieg ...... G06K 9/00624 |
| | | 382/103 |
| 2014/0355951 A1 | 12/2014 | Tabak |
| 2014/0375807 A1 | 12/2014 | Muetzel et al. |
| 2015/0032535 A1 | 1/2015 | Li et al. |
| 2015/0066349 A1 | 3/2015 | Chan et al. |
| 2015/0084790 A1 | 3/2015 | Arpin et al. |
| 2015/0086175 A1 | 3/2015 | Lorenzetti |
| 2015/0088335 A1 | 3/2015 | Lambert et al. |
| 2015/0103159 A1 | 4/2015 | Shashua et al. |
| 2015/0161483 A1* | 6/2015 | Allen ................ G06K 9/00221 |
| | | 382/118 |
| 2015/0211868 A1 | 7/2015 | Matsushita et al. |
| 2015/0266575 A1 | 9/2015 | Borko |
| 2015/0294174 A1 | 10/2015 | Karkowski et al. |
| 2016/0023762 A1 | 1/2016 | Wang |
| 2016/0035391 A1 | 2/2016 | Ross et al. |
| 2016/0042767 A1 | 2/2016 | Araya et al. |
| 2016/0062762 A1 | 3/2016 | Chen et al. |
| 2016/0062992 A1 | 3/2016 | Chen et al. |
| 2016/0063642 A1 | 3/2016 | Luciani et al. |
| 2016/0064036 A1 | 3/2016 | Chen et al. |

(56) References Cited

U.S. PATENT DOCUMENTS

| | | |
|---|---|---|
| 2016/0065908 A1 | 3/2016 | Chang et al. |
| 2016/0144788 A1 | 5/2016 | Perrin et al. |
| 2016/0148638 A1 | 5/2016 | Ross et al. |
| 2016/0285492 A1 | 9/2016 | Vembar et al. |
| 2016/0332747 A1 | 11/2016 | Bradlow et al. |
| 2017/0032673 A1 | 2/2017 | Scofield et al. |
| 2017/0053169 A1 | 2/2017 | Cuban et al. |
| 2017/0053674 A1 | 2/2017 | Fisher et al. |
| 2017/0059265 A1 | 3/2017 | Winter et al. |
| 2017/0066374 A1 | 3/2017 | Hoye |
| 2017/0076396 A1 | 3/2017 | Sudak |
| 2017/0085829 A1 | 3/2017 | Waniguchi et al. |
| 2017/0113664 A1 | 4/2017 | Nix |
| 2017/0178422 A1 | 6/2017 | Wright |
| 2017/0178423 A1 | 6/2017 | Wright |
| 2017/0193828 A1 | 7/2017 | Holtzman et al. |
| 2017/0253330 A1 | 9/2017 | Saigh et al. |
| 2017/0324897 A1 | 11/2017 | Swaminathan et al. |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 1997038526 A1 | 10/1997 |
| WO | 2000013410 A1 | 3/2000 |
| WO | 2000021258 A1 | 4/2000 |
| WO | 2000045587 A2 | 8/2000 |
| WO | 2000072186 A2 | 11/2000 |
| WO | 2002061955 A2 | 8/2002 |
| WO | 2004066590 A2 | 8/2004 |
| WO | 2004111851 A | 12/2004 |
| WO | 2005053325 A2 | 6/2005 |
| WO | 2005054997 A2 | 6/2005 |
| WO | 2007114988 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |
| WO | 2016033523 A1 | 3/2016 |
| WO | 2016061516 A1 | 4/2016 |
| WO | 2016061525 A1 | 4/2016 |
| WO | 2016061533 A1 | 4/2016 |

OTHER PUBLICATIONS

Office Action issued in U.S. Appl. No. 11/369,502 dated Sep. 30, 2010, 12 pages.

Office Action issued in U.S. Appl. No. 11/369,502 dated Jul. 14, 2011, 17 pages.

Office Action issued in U.S. Appl. No. 11/369,502 dated Jan. 31, 2012, 18 pages.

Examiner's Answer (to Appeal Brief) issued in U.S. Appl. No. 11/369,502 dated Oct. 24, 2012, 20 pages.

Office Action issued in U.S. Appl. No. 13/723,747 dated Mar. 22, 2013, 6 pages.

Office Action issued in U.S. Appl. No. 13/723,747 dated Jun. 26, 2013, 6 pages.

Office Action issued in U.S. Appl. No. 13/723,747 dated Sep. 10, 2013, 7 pages.

Advisory Action issued in U.S. Appl. No. 13/723,747 dated Feb. 24, 2014, 4 pages.

Office Action issued in U.S. Appl. No. 13/723,747 dated Mar. 20, 2014, 6 pages.

Office Action issued in U.S. Appl. No. 13/723,747 dated Nov. 10, 2014, 9 pages.

Notice of Allowance and Fees Due issued in U.S. Appl. No. 13/723,747 dated Mar. 30, 2015, 6 pages.

First Action Interview Pilot Program Pre-Interview Communication issued in U.S. Appl. No. 14/588,139 dated May 14, 2015, 4 pages.

Office Action issued in U.S. Appl. No. 14/593,853 dated Apr. 20, 2015, 30 pages.

Office Action issued in U.S. Appl. No. 14/593,956 dated May 6, 2015, 10 pages.

PCT International Search Report and Written Opinion issued in Application No. PCT/US07/63485 dated Feb. 8, 2008, 10 pages.

Chapter 5: "Main Memory," Introduction to Computer Science course, 2004, 20 pages, available at http://www2.cs.ucy.ac.cy/~nicolast/courses/lectures/MainMemory.pdf.

Sony Corporation, Digital Still Camera (MVC-CD200/CD300), Operation Manual, 2001, 108 pages, Sony, Japan.

Steve'S Digicams, Kodak Professional DCS 620 Digital Camera, 1999, 11 pages, United States, available at: http://www.steves-digicams.com/dcs620.html.

Gregory J. Allen, "The Feasibility of Implementing Video Teleconferencing Systems Aboard Afloat Naval Units" (Master's Thesis, Naval Postgraduate School, Monterey, California), Mar. 1990, 143 pages.

Bell-Northern Research Ltd., "A Multi-Bid Rate Interframe Movement Compensated Multimode Coder for Video Conferencing" (Final Report prepared for DARPA), Apr. 1982, 92 pages, Ottawa, Ontario, Canada.

Xiaoqing Zhu, Eric Setton, Bernd Girod, "Rate Allocation for Multi-Camera Surveillance Over an Ad Hoc Wireless Network," 2004, 6 pages, available at http://msw3.stanford.edu/~zhuxq/papers/pcs2004.pdf.

Office Action issued in U.S. Appl. No. 14/593,722 dated Sep. 25, 2015, 39 pages.

Office Action issued in U.S. Appl. No. 14/593,853 dated Sep. 11, 2015 (including Summary of Interview conducted on May 9, 2015), 45 pages.

Notice of Allowance issued in U.S. Appl. No. 14/593,956 dated Oct. 26, 2015, 10 pages.

"IEEE 802.1X," Wikipedia, Aug. 23, 2013, 8 pages, available at: http://en.wikipedia.org/w/index.php?title=IEEE_802.1X&oldid=569887090.

Notice of Allowance issued in U.S. Appl. No. 14/588,139 dated Aug. 14, 2015, 19 pages.

"Near Field Communication," Wikipedia, Jul. 19, 2014, 8 pages, available at: https://en.wikipedia.org/w/index.php?title=near_field_communication&oldid=617538619.

PCT International Search Report and Written Opinion issued in Application No. PCT/US15/47532 dated Jan. 8, 2016, 22 pages.

Office Action issued in U.S. Appl. No. 14/686,192 dated Apr. 8, 2016, 19 pages.

Office Action issued in U.S. Appl. No. 14/715,742 dated Aug. 21, 2015, 13 pages.

Office Action issued in U.S. Appl. No. 14/715,742 dated Mar. 11, 2016, 14 pages.

Office Action issued in U.S. Appl. No. 14/593,722 dated Apr. 10, 2015, 28 pages.

Office Action issued in U.S. Appl. No. 14/686,192 dated Dec. 24, 2015, 12 pages.

"Portable Application," Wikipedia, Jun. 26, 2014, 4 pages, available at: http://en.wikipedia.org/w/index.php?title=Portable_application&oldid=614543759.

"Radio-Frequency Identification," Wikipedia, Oct. 18, 2013, 31 pages, available at: http://en.wikipedia.org/w/index.php?title=Radio-frequency_identification&oldid=577711262.

(56) References Cited

OTHER PUBLICATIONS

Advisory Action issued in U.S. Appl. No. 14/715,742 dated May 20, 2016 (including Summary of Interview conducted on May 12, 2016), 4 pages.
Advisory Action issued in U.S. Appl. No. 14/715,742 dated Jun. 14, 2016, 3 pages.
Office Action issued in U.S. Appl. No. 14/715,742 dated Sep. 23, 2016, 17 pages.
Office Action issued in U.S. Appl. No. 15/438,166 dated Apr. 21, 2017, 17 pages.
U.S. Appl. No. 62/197,493 (Fisher et al.), filed Jul. 27, 2015, 12 pages.
Office Action issued in U.S. Appl. No. 15/467,924 dated May 8, 2017, 10 pages.
Office Action issued in U.S. Appl. No. 15/412,044 dated Jun. 1, 2017, 10 pages.

* cited by examiner

SYSTEMS, APPARATUSES AND METHODS FOR TRIGGERING ACTIONS BASED ON DATA CAPTURE AND CHARACTERIZATION

CROSS-REFERENCE TO RELATED APPLICATIONS

This application claims priority to U.S. Provisional Patent Application No. 62/333,818, filed on May 9, 2016, titled "Systems, Apparatuses and Methods for Creating, Identifying, Enhancing, and Distributing Evidentiary Data." The entire disclosure of Application No. 62/333,818 is hereby incorporated herein by reference.

STATEMENT REGARDING FEDERALLY SPONSORED RESEARCH

Not Applicable.

TECHNICAL FIELD OF THE INVENTION

This disclosure relates generally to systems and methods for triggering actions in response to data capture and characterization. More particularly, but not by way of limitation, this disclosure relates to using fixed and/or mobile devices to capture real-world image data, making determinations in real time pertaining to the captured data, and triggering actions based upon such determinations.

BACKGROUND

Today's law enforcement officers have various means of technology at their disposal to perform their tasks. Police vehicles are typically equipped with some form of computerized technology that allows the officer access to critical information, and video/audio equipment that captures on-scene information that is commonly used as evidence in legal proceedings. However, while technology has provided law enforcement officers powerful tools to perform their jobs, it has also added a level of complexity for officers on patrol.

An officer on patrol routinely receives bulletins and alerts regarding criminal activity. The communications are typically sent to the officer over a radio system and/or electronically to an onboard receiver in the officer's vehicle or hand held radio. These communications are typically transmitted from police headquarters or dispatch centers and provide key details regarding suspects and other information relevant to the criminal activity or occurrence of interest. A patrol officer may receive multiple alerts regarding different occurrences and various details, the officer could become overloaded with the level of information he has to personally monitor while still performing his other tasks and controlling the vehicle.

Conventional vehicle radio/receiver or computer systems used by law enforcement are generally not configured to perform and respond to on-the-spot real-time data capture and characterization. Thus, while vast amounts of data and information are available to today's law enforcement officers, the technology at their disposal lacks the ability to perform automatic and autonomous characterization of and response to available data. In addition to law enforcement, other institutions and establishments (e.g., banks, casinos, convenience stores, retail establishments, etc.) generally utilize conventional technology providing limited or no autonomous data characterization and response capability.

A need remains for techniques to improve the operational and processing ability of technology as used for law enforcement and other public safety related organizations. The advancements in the processing capability should also increase safety and efficiency in the performance of law enforcement officers' daily duties.

SUMMARY

In view of the aforementioned problems and trends, embodiments of the present invention provide systems and methods for detecting specified objects and attributes of interest in captured image and audio data.

According to an aspect of the invention, a method includes receiving a wireless communication with a receiver, the communication indicating designated content to search for in image data; obtaining image data using at least one camera device configured to capture image data; using a microprocessor linked to the receiver and the at least one camera device, (a) analyzing the obtained image data for the presence of the designated content and (b) analyzing obtained image data containing the designated content for the presence of at least one designated attribute associated with the designated content; and triggering an action by the microprocessor if the at least one designated attribute is detected in the obtained image data containing the designated content.

According to another aspect of the invention, a method includes linking a computer server via a communication network to a plurality of camera devices configured to capture image data; using the server, (a) analyzing image data captured by the plurality of camera devices for the presence of designated content and (b) analyzing captured image data containing the designated content for the presence of at least one designated attribute associated with the designated content; using the server, uploading for storage the captured image data or components of the captured image data, containing the at least one designated attribute; and using the server, sending via the communication network a notice relating to the captured image data or to the components of the captured image data.

According to another aspect of the invention, a system includes a receiver configured to receive wireless communications; at least one camera device configured to capture image data; a microprocessor linked to the receiver and the at least one camera device; wherein the microprocessor is configured with instructions to (a) analyze image data captured by the at least one camera device for the presence of designated content indicated in a communication received by the receiver and (b) analyze captured image data containing the designated content for the presence of at least one designated attribute associated with the designated content; and wherein the microprocessor is configured with instructions to trigger an action if the at least one designated attribute is detected in the captured image data containing the designated content.

According to another aspect of the invention, a system includes a plurality of camera devices configured to capture image data; a computer server linked to the plurality of camera devices via a communication network; wherein the computer server is configured with instructions to (a) analyze image data captured by the plurality of camera devices for the presence of designated content and (b) analyze captured image data containing the designated content for the presence of at least one designated attribute associated with the designated content; wherein the computer server is configured with instructions to upload for storage the captured image data or components of the captured image data, containing the at least one designated attribute; and wherein the computer server is configured with instructions to send via the communication network a notice relating to the captured image data or to the components of the captured image data.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
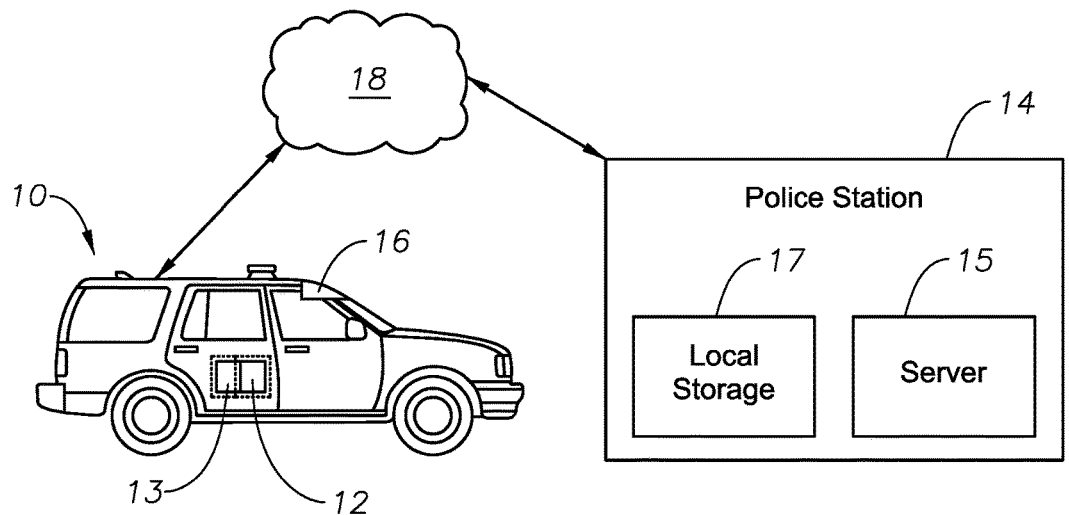
FIG. 1, in accordance with some embodiments of the present disclosure, depicts a communication scheme and data flow/exchange, specifically between a police vehicle with an onboard camera device and a police station.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . ." Also, the term "couple," "coupled," or "linked" is intended to mean either an indirect or direct electrical, mechanical, or wireless connection. Thus, if a first device couples to or is linked to a second device, that connection may be through a direct electrical, mechanical, or wireless connection, or through an indirect electrical, mechanical, or wireless connection via other devices and connections.

As used throughout this disclosure the term "computer" encompasses special purpose microprocessor-based devices such as a digital video surveillance system primarily configured for executing a limited number of applications, and general purpose computers such as laptops, workstations, or servers which may be configured by a user to run any number of off the shelf or specially designed software applications. Computer systems and computer devices will generally interact in the same way with elements and aspects of disclosed embodiments. This disclosure also refers to memory or storage devices and storage drives interchangeably. In general, memory or a storage device/drive represents a medium accessible by a computer (via wired or wireless connection) to store data and computer program instructions. It will also be appreciated that use of the term "microprocessor" in this disclosure encompasses one or more processors.

The terms "video data" and "visual data" refer to still image data, moving image data, or both still and moving image data, as traditionally understood. Further, the terms "video data" and "visual data" refer to such image data alone, i.e., without audio data and without metadata. The term "image data" (in contrast to "still image data" and "moving image data") encompasses not only video or visual data but also audio data and/or metadata. That is, image data may include visual or video data, audio data, metadata, or any combination of these three. This image data may be compressed using industry standard compression technology (e.g., Motion Picture Expert Group (MPEG) standards, Audio Video Interleave (AVI), etc.) or another proprietary compression or storage format. The terms "camera," "camera device," and the like are understood to encompass devices configured to record or capture visual/video data or image data. Such devices may also be referred to as video recording devices, image capture devices, or the like. Metadata may be included in the files containing the video (or audio and video) data or in separate, associated data files, that may be configured in a structured text format such as eXtensible Markup Language (XML).

The term "metadata" refers to information associated with the recording of video (or audio and video) data, or information included in the recording of image data, and metadata may contain information describing attributes associated with one or more acts of actual recording of video data, audio and video data, or image data. That is, the metadata may describe who (e.g., Officer ID) or what (e.g., automatic trigger) initiated or performed the recording. The metadata may also describe where the recording was made. Metadata may also include telemetry or other types of data. For example, location may be obtained using global positioning system (GPS) information or other telemetry information. The metadata may also describe why the recording was made (e.g., event tag describing the nature of the subject matter recorded). The metadata may also describe when the recording was made, using timestamp information obtained in association with GPS information or from an internal clock, for example. Metadata may also include information relating to the device(s) used to capture or process information (e.g. a unit serial number). From these types of metadata, circumstances that prompted the recording may be inferred and may provide additional information about the recorded information. This metadata may include useful information to correlate recordings from multiple distinct recording systems as disclosed herein. This type of correlation information may assist in many different functions (e.g., query, data retention, chain of custody, and so on). The metadata may also include additional information as described herein, such as: location and size of an object of interest on screen, object's color and confidence level, vehicle make and confidence level, vehicle type and confidence level, license plate number/state (e.g., which of the 50 US states) and confidence level, and number of pedestrians. The terms "license plate number," "license plate character," and the like are all understood to encompass both numbers and other characters on a license plate.

The terms "cloud" and "cloud storage" are used interchangeably in this disclosure to describe that data is stored in an area generally accessible across a communication network (which may or may not be the Internet). A "cloud" may refer to a public cloud, private cloud, or combination of a public and private cloud (e.g., hybrid cloud). The term "public cloud" generally refers to a cloud storage area that is maintained by an unrelated third party but still has certain security measures in place to ensure that access is only allowed to authorized users. The term "private cloud" generally refers to a cloud storage area that is maintained by a related entity or that is maintained on physical computer resources that are separate from any unrelated users.

The term "global" refers to worldwide and the term "global access" refers to being available or accessible from anywhere in the world via conventional communication means (e.g. the communication network described herein).

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

FIG. 1 depicts an embodiment of this disclosure. A police vehicle 10 is equipped with a computer 12 (which accordingly may be referred to as "vehicle 10 computer 12") linked to a server 15 housed in a police station 14 via a communication network 18 (e.g., Internet, Cloud, radio network, Bluetooth, Wi-Fi, 3G, 4G, LTE, satellite, etc.). The computer 12 is linked with a communications module that includes a (e.g., mobile) receiver 13. The police vehicle 10 may be a car, motorcycle, bicycle, aircraft, watercraft, or other transportation means. The police station 14 may also house a memory storage bank 17 in addition to server 15 for data processing and communications. The vehicle 10 is equipped with one or more camera devices 16 to capture image data from the real world. The camera device(s) 16 may or may not be mobile. The camera device 16 may also be configured with internal memory (e.g. hard disk) and/or coupled to a local or remote storage drive for recordation (in digital or analog format) of the collected information. Suitable camera devices 16 that may be used to implement embodiments of this disclosure include the devices commercially available from COBAN Technologies Inc., in Houston, Tex. (http//www.cobantech.com).

The vehicle 10 computer 12 is configured to access one or more databases (onboard the vehicle 10 or remote via the communication network 18) containing a repository with detailed information and data of existing vehicles, structures, objects, people, etc.). For example, an accessible database may be populated with data regarding parameters, shapes, other information relating to particular individuals, states and cities, vehicle identification parameters/characteristics (makes, models, colors, etc.), weapons data, etc. The database(s) can be updated as often as necessary. It will be appreciated that for law enforcement applications, the computer 12 may have access to databases and data repositories that are not available to the general public. In some embodiments, the police station 14 memory storage bank 17 houses the database accessed by the vehicle 10 computer 12.

In addition to receiving regular communications via the receiver 13, the vehicle computer 12 microprocessor is configured with specific instructions to be carried out upon receipt of certain communications, such as Amber alerts, Silver alerts, etc., (via the communication network 18) from the police station 14 or other designated agencies or systems, such as the FBI, DEA, ATF, etc. For example, law enforcement agencies often issue Be on Look Out ("BOLO") alerts to bring to the attention of law enforcement officers key information regarding an occurrence or activity of high importance. Such alerts typically include a description with some known details and facts relating to a suspect or an item or event of interest. The officer who receives the BOLO alert is intended to keep an eye out for the suspect or item of interest by continually or periodically scanning his environment for the particular descriptive details of the suspect/item identified in the alert.

The present disclosure provides the officer the means to leverage technology to perform this continual monitoring task. Upon receipt of such alerts, the computer 12 microprocessor activates the camera device 16 (if not already activated) to start collecting information and processing the captured image data to determine whether the specific content identified in the alert is present in the captured image data. The computer 12 microprocessor is configured to search the captured image data for the presence of the designated content according to the received alert or communication. For example, the designated content may include information such as: a geographical parameter (e.g. GPS coordinate), location data (street designation, historic site, monument, etc.), vehicle type (SUV, truck, sedan, motorcycle, etc.), license plate number(s), particular objects (traffic lights, street signs, etc.), particular shapes (human, animal, etc.), or a person, e.g., with particular characteristics.

When an object enters the scene, the computer 12 microprocessor performs analytics on the captured image data using an analytics engine that references the accessed database(s), and the analytics include creating snapshots and character scanning, optical character recognition (OCR), pixel scanning, and shape/pattern recognition analytics to analyze and search the captured data for the presence of images matching the designated content. The analytics software may also analyze a scene, tracking identified objects of interest, for example, a police officer's movements. For example, if an officer falls and becomes horizontal for a certain amount of predetermined time, the microprocessor can send an alert to police dispatch through the communication network 18 so that dispatch can call via radio or cell phone to check on the fallen officer. If there is no response from the fallen officer in a predetermined amount of time, dispatch can send support to assist in case of a serious issue. The shape/pattern detection analytics may also be used to detect objects already in or coming into the scene, such as a person walking or running, and also to detect the direction of travel of such objects. It may also be used to detect objects or people approaching the officer based on changes in the detected measured distance between the officer and person/object, and based on this analysis, the microprocessor can send an alert to the officer on the scene (e.g., via radio, 3G/4G wireless networks, or Body Worn Camera (BWC) speaker over Wi-Fi or Bluetooth). Additional features that may be provided by the analytics engine include automatically marking image data if a crash was detected in the background of the scene, such as a vehicle rolling or flipping. Yet another aspect of the shape/pattern detection features provided by the analytics engine is the determination of a weapon threat. The scene can be scanned for the detection of objects such as potential weapon types like guns, knives, etc., being held in a person's hand or for various threatening stances by a potential adversary such as detecting when the adversary is standing, squatting sideways, running, etc.

The detection/analytics capabilities of the disclosed embodiments also include the ability to scan the entire or specified area of a scene for any movement. For example, if an officer is parked somewhere filling out a report and looking down, if the system detects movement an alert sound or message on a display (e.g. the vehicle display) can notify the officer to be aware. With multiple viewing angles, the alerts can also notify the officer which direction the movement came from by using distinct sounds for each direction such as front, rear, right side or left side, voice notification of the direction and/or notification messages on the display. The system can also notify the officer if it is a vehicle, person, or an unknown object and if the object is moving fast or in a threatening manner. Such embodiments may incorporate the camera/microphone unit 16 described below with respect to FIGS. 6-8.

Figure 2:
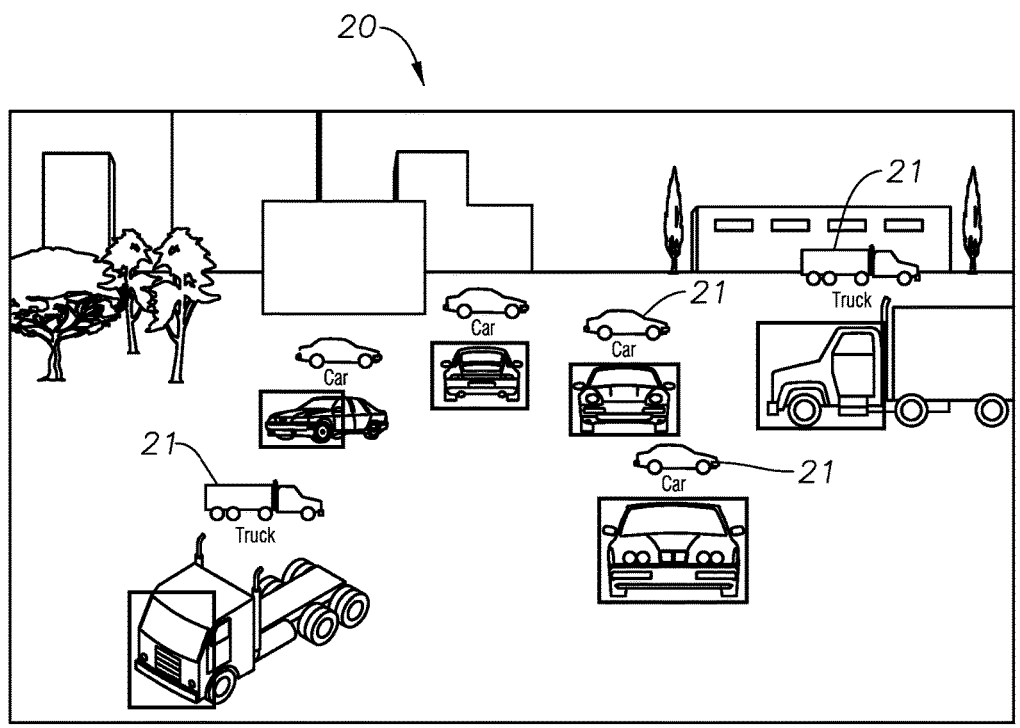
FIG. 2, in accordance with some embodiments of the present disclosure, depicts the recognition of a plurality of "vehicle" shapes in a video frame of visual data.
Figure 3:
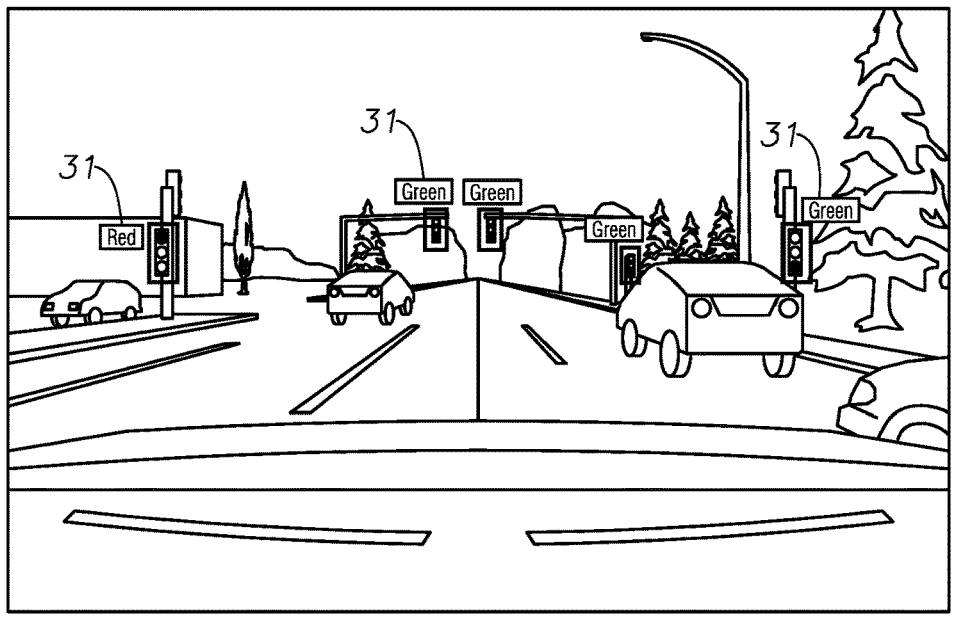
FIG. 3, in accordance with some embodiments of the present disclosure, depicts the recognition of various traffic signal shapes in a video frame of visual data.
Figure 4:
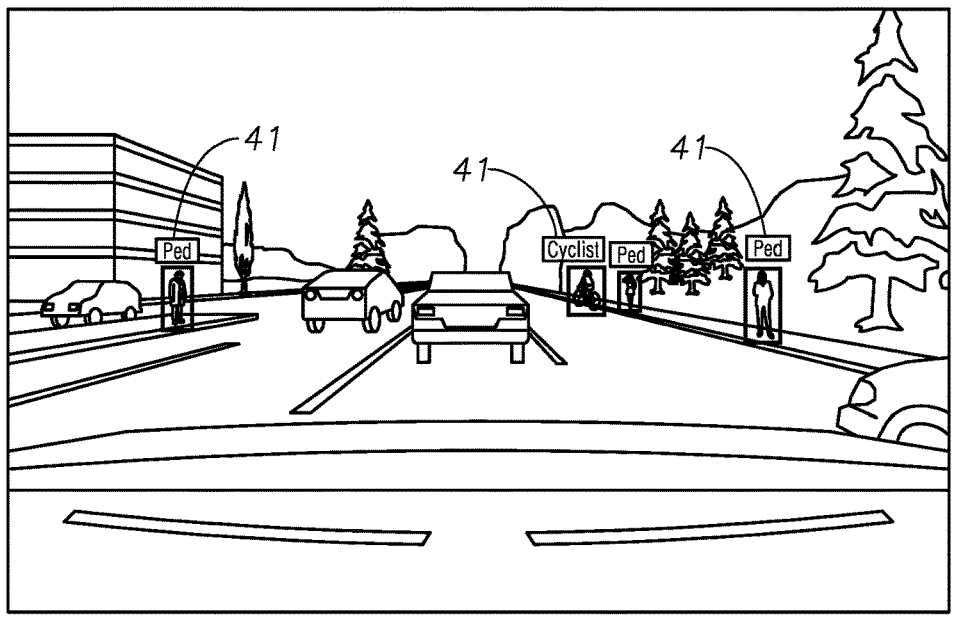
FIG. 4, in accordance with some embodiments of the present disclosure, depicts the recognition of a plurality of "people" shapes in a video frame of visual data.

FIGS. 2-4 depict scenes as processed by the computer 12 microprocessor to detect various shapes and objects according to embodiments of this disclosure. FIG. 2 depicts the recognition of multiple vehicle shapes (shown in and above bounding boxes) 21 in a video frame 20 of the information captured by a camera device 16. This data may be used, e.g., to detect a vehicle of interest. FIG. 3 depicts the recognition of various traffic signal shapes (shown in bounding boxes) 31 in a video frame 30 of the information captured by a camera device 16. The detection of such real-world features can be used to provide additional location data. FIG. 4 depicts the recognition of multiple "people" shapes (shown in bounding boxes) 41 in a video frame 40 of the information captured by a camera device 16. Such data may be used to implement the applications related to officer safety or behavior patterns as disclosed herein.

In some embodiments, once the analytics engine detects a match or near match of the designated content in the captured image data, the analytics engine proceeds to another step of further analyzing the data containing the designated content to detect for the presence of one or more designated details or attributes of or associated with the designated content. For example, a communication may be received by the receiver 13 (such as a BOLO, Amber, or Silver alert), designating the content to search for as a car, and the attributes as a silver Audi A6 sedan. In this case, the analytics engine will scan and search the captured image data for a match of the descriptor, i.e., the car. If the analytics engine detects the presence of a car in the captured image data, the data is then further analyzed to determine if the designated attributes (i.e., vehicle make—Audi, vehicle model—A6, color—silver, vehicle type—sedan) are present in the data. Other possible designated attributes that may be provided in a communication or alert include, for example: state identifiers (e.g., license plate numbers, characters, emblems, mottos, etc.). In some embodiments, the computer 12 microprocessor continually writes all metadata/attribute information associated with the detected designated content to a text or XML file. It will be appreciated that the designated content descriptors and associated designated attributes may comprise an unlimited variety of items and descriptors, as exist in the real world. The embodiments of this disclosure are not to be limited to any specific content or attribute of such content.

In some embodiments, the analysis further includes the determination of a confidence level or criterion for the designated attribute(s). Modern processors provide the ability for high-speed analysis of vast amounts of data. Physical dimensions and parameters of real-world objects represent factual data that can be mathematically measured, analyzed, and compared. For example, the length, width, and height of a vehicle of a given make and model represents factual data. In some embodiments, the analytics engine analysis of the collected data entails a breakdown of the captured images into data points or pixels that are then analyzed to determine respective spacing and dimensions, which can then be compared to the real-world parameters in the database library of existing items. For instance, continuing with the silver Audi A6 example, once the analytics engine detects a vehicle in the image data, it then performs further analysis to detect for the color silver based on a pixel hue analysis, it may then continue the analysis to mathematically define the dimensions of the detected vehicle for comparison against the actual Audi A6's dimension parameters stored in the database. If a match or near match is found between the dimensions of the detected car and one of the A6 models in the library, the engine then calculates a probability factor representing a confidence level for the match and compares that to a criterion for equivalence or matching of the detected object and the object stored in the database. If, for example, the criterion for equivalence has been set (e.g., by a user via the software) at 95% or greater for vehicle data matching parameters and the calculated probability factor equaled or exceeded 95%, the analytics engine would determine a positive result and proceed with triggering an action as described for the disclosed embodiments.

Different criteria for equivalence can be set for different items. For example, the criterion of equivalence for an affirmative match result for a license plate number may be set at 55% or better, to allow for instances when only a partial plate number is decipherable from the captured image. In the case of attributes for which there are no standard items (for comparison against the detected item for purposes of determining equivalence) stored in the database, the analytics engine can bypass this database query and perform a character-recognition analysis. However, for law enforcement applications, the database available to officers will likely contain all available information relating to data such as a license plate number. In some embodiments, the criterion of equivalence for an affirmative match result may be based on a probability factor from a combination of analyzed attributes.

In some embodiments, the analytics to determine a confidence level or criterion for the designated attribute(s) are based on a deep learning algorithm. The computer 12 may be configured with software providing a deep learning analytics engine. Defined shapes and movement rules, multiple images of vehicle types, make, model, etc., can be input and stored in the deep learning engine at different viewing angles, distances, various lighting conditions, etc. The captured image data can be compared against the engine contents to provide a data output with a percentage of confidence of accuracy for its attributes to trigger an action as described herein. The analytics and rules can be applied to any object (e.g., pedestrians, animals, street signs, etc.).

In some embodiments, the analytics for recognition and detection of the designated content is distributed among the vehicle 10 computer 12 and one or more remote computers (e.g. the server 15 in the police station 14). In such embodiments, the server 15 may be configured to generate a neural net object model for the vehicle 10 computer 12. The vehicle 10 computer 12 can also be configured to use a separate neural network to instantly achieve multiple object recognition as described herein. The vehicle 10 computer 12 and the remote computer(s) can communicate and exchange data via the communication network 18. In yet other embodiments, the vehicle 10 computer 12 and/or the remote computer(s) (e.g. server 15) may be configured with artificial intelligence (AI) software providing the system the ability to learn, to further increase the accuracy of object recognition. In some embodiments, the analytics engine is configured to detect unknown objects (e.g. a modified vehicle). This data can be locally stored for later upload or immediately transmitted to another location (e.g. to server 15) for verification and/or classification to aid in the training of detection of objects by the detection engine. With AI implementations, this type of classification can be done in or near real-time on the edge device such as an in-car video unit or a wearable device such as a body worn camera. In this description, an "edge" device generally refers to a device used or located at a point of intertest. Thus, for the disclosed embodiments, an edge device is considered an on-scene device. It will be appreciated by those skilled in the art that embodiments of this disclosure may be implemented using conventional software platforms and coding configured to perform the techniques as disclosed herein.

Once the analytics engine determines that the designated attribute(s) is/are present in the captured image data, the microprocessor triggers an action. The triggered action may include:

(i) Providing an alert—The officer may be given a visual and/or audible alert on his vehicle display that a positive match has been detected. An alert may also be sent via the communication network to the police station or other locations. Alert notifications and/or images and metadata may also be sent to any other vehicle or officer that may be nearby or heading in the general direction of the detected object of interest.

(ii) Displaying an image—A video or still image of the detected content may be displayed on the vehicle display. A snapshot (such as video frame 20, 30 or 40) can be displayed, highlighting or putting a bounding box (such as 21, 31, or 41) around the object detected, and its movements can be tracked on the display in real-time or after the fact. Captured image data may also be transmitted via the communication network for viewing on a smart phone, tablet, PC, or the like (e.g., of another officer in another location in the field or at a remote location, e.g., at central headquarters).

(iii) Activating data recording—An onboard storage device may start saving the information being captured by the camera device. Other camera devices in the vehicle can be triggered to start recording. The captured information may also be transmitted concurrently via the communication network to be stored at the police station or another location. The triggered action may also include the activation of other camera devices worn by officers or within other law enforcement vehicles within a set perimeter of the detected item of interest.

(iv) Communicating information relating to the detected content—The captured information (e.g., data files and/or associated metadata files) may be transmitted via the communication network to the police station or other locations (e.g., other police officers in the area). Information such as location (latitude/longitude), direction of travel (e.g., of a vehicle of interest), speed and time of the scan, a snapshot, shape detection attributes, etc., can be transmitted to police dispatch or other remote location. For example, associated metadata and/or a snapshot can be transmitted to a remote location or to any or all other computer devices or members/users in the group or to a dispatch/command center.

(v) Activating a hardware function—In addition to or instead of the activation of data recording (iii, above), equipment or systems may be activated depending on the detected content (e.g., automatic activation of the vehicle's light bar if a crash scene is detected). Live video/audio streaming may also be activated.

(vi) Activating a software function—A voice-to-text program may be activated to produce a text file of audio captured in association with the captured video. A voice keyword-based program may be activated to trigger other actions (e.g., if a key word is detected such as "gun". "shots fired", or "kill", video can be marked and sent with an alert to the police station or other location or device to inform other officers).

(vii) Extracting and storing content of the obtained information—Other law enforcement agencies or designated systems may be granted access, via the communication network, to download and store the information captured by the camera device.

(viii) Production of a text file—In some embodiments, audio captured in association with the captured video by a mobile audio recorder in the vehicle or worn by the officer can be converted to text (in real-time or from recorded data). The conversion process can output a separate text file for viewing on the vehicle display, and may also transmit the data via the communication network for viewing on a smart phone, tablet, PC, or at a remote location. One use of the text file can be for performing a keyword search during an active or previously recorded event. In some embodiments where video and metadata is continually recorded, all objects or specifically defined objects can be scanned and the metadata associated with the detected objects of interest can be written to a text/xml file or other small database. Metadata captured in the image data or associated with the video data may also be scanned separately, in real-time or from prerecorded metadata. In some embodiments, the vehicle 10 computer 12 may also be configured to mark start and end points in the captured image data associated with scanned metadata. In other embodiments, the vehicle 10 computer 12 may also be configured to isolate images or produce snapshots or video clips associated with scanned metadata. All of this data can be stored locally for a predetermined time or on a FIFO basis; it can also be uploaded to a remote location continually or in configurable intervals and packet sizes. This data can also be stored on a remote server (as described below with reference to a Global Data Access System).

Figure 5:
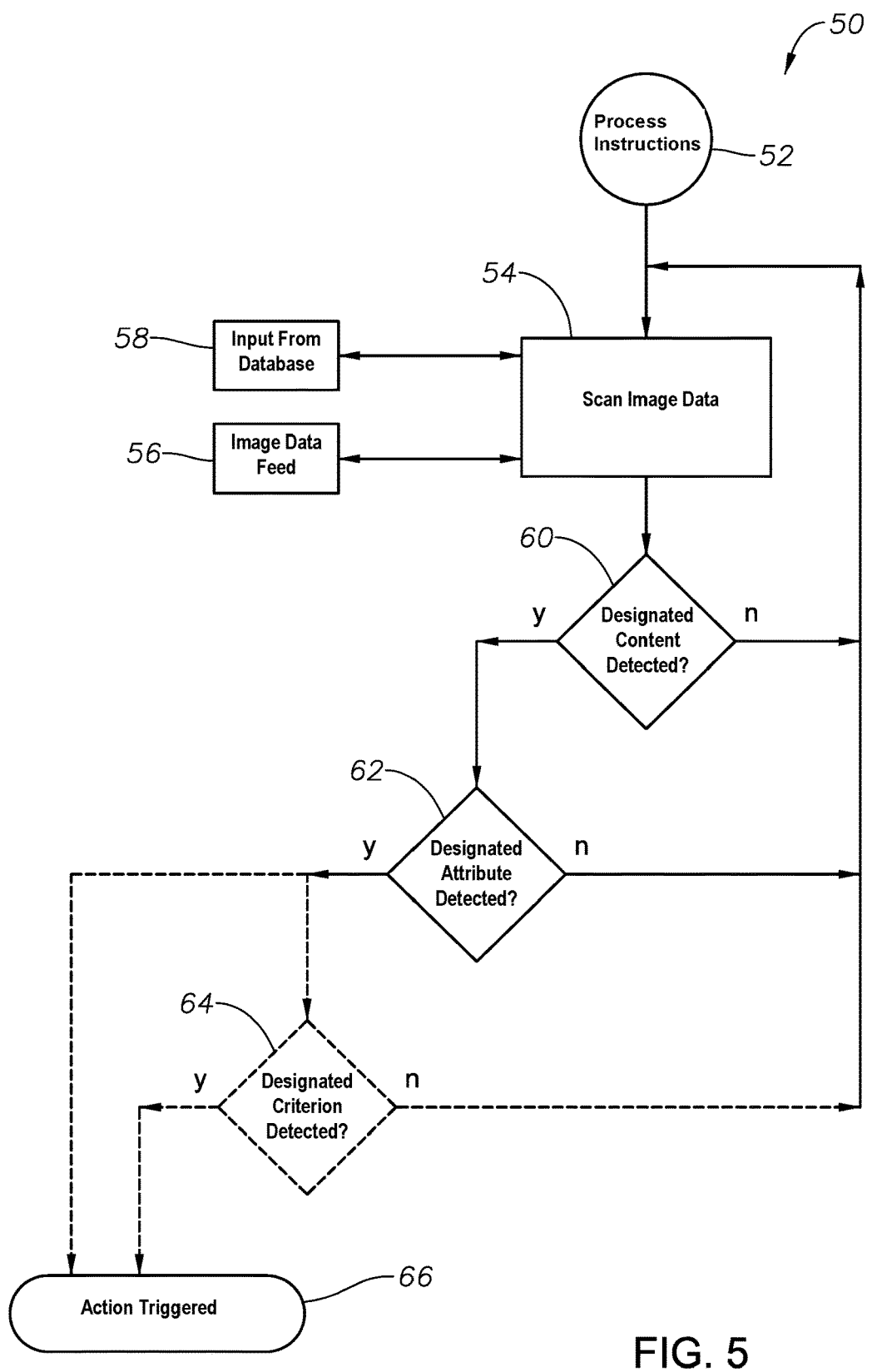
FIG. 5, in accordance with some embodiments of the present disclosure, depicts a processing flow chart for an analytics engine.

FIG. 5 depicts a processing flow chart for an analytics engine 50 embodiment in accordance with this disclosure. As described above, the receiver 13 in the vehicle 10 receives the communication indicating the designated content to search for, along with the known attribute(s) associated with the designated content. At module 52, the vehicle computer 12 processes the instructions and the microprocessor commences the scanning analysis. At module 54, the analysis entails a data feed 56 of the image data from the linked camera device(s) 16 to the computer 12 microprocessor. The data feed 56 from the camera device(s) 16 to the computer 12 may be wireless or via cabling (e.g. using a wired onboard vehicle camera). In some embodiments, the computer 12 may be configured to automatically activate the linked mobile camera device(s) 16 to start collecting image data, if the device(s) is/are not already activated. Module 54 also comprises linking with a database 58 to perform the analysis of the collected image data. As previously described, the database 58 may be resident in the vehicle 10 computer 12 or remotely located (e.g. the police station 14 memory storage bank 17) and accessed via the communication network 18. At module 60, the analysis continues with a scan of the image data captured by the camera device(s) 16 to detect for the presence of the designated content. If the designated content is not detected in the captured image data, module 60 entails a return to module 54 and the analysis continues with the scanning of additional image data collected by the camera device(s) 16. If the designated content is detected, the flow proceeds with analysis at module 62, where the image data containing the detected designated content is further analyzed to determine if the data comprises the designated attribute(s) conveyed in the communication. If the designated attribute(s) is/are not detected, module 62 entails a return to module 54 and the analysis continues with the scanning of additional image data collected by the camera device(s). If the designated attribute(s) is/are detected, the flow proceeds directly to module 66, or in some embodiments to an additional (optional) module 64. If proceeding directly from module 62 to module 66, the computer 12 microprocessor triggers an action as previously described. With embodiments comprising optional module 64, the image data containing the detected designated attribute(s) is further analyzed to determine if the attribute(s) meets the designated criterion, as described above. If the attribute(s) meets the designated criterion, the flow proceeds to module 66 and an action is triggered. If the attribute(s) does not meet the designated criterion, module 64 entails a return to module 54 and the analysis continues with the scanning of additional image data collected by the camera device(s) 16. The computer 12 can process multiple searches relating to multiple incoming communications, performing the respective scanning/analysis on the captured image data. The collection and processing of image data may be stopped and started as desired by a user (e.g. an officer in the vehicle) entering a command (e.g., a voice command or a command that is typed/keyed/entered by touchpad) or pushing a button on the computer 12 or on a BWC 29, or by another incoming communication (e.g. from the alert dispatching source) instructing the computer 12 to cancel or start/resume the particular search/analysis. When an alert is cleared or cancelled, the computer 12 resumes scanning all available image data captured in the scene until another communication is received to trigger another action (e.g. another alert) or the officer manually enters a different instruction. The computer 12 may also be configured to automatically clear an alert after running a scan without a match for a predetermined time or when the vehicle 10 is housed or turned off (e.g. when a patrol car is parked at the police station at the end of a shift). It will be appreciated by those skilled in the art that embodiments of the analytics engine disclosed herein may be implemented using any suitable computer platforms and coding as known in the art.

A benefit of the functionality provided by the disclosed embodiments is that the camera device and detection/analytics engine may find an object or person of interest that a police officer didn't notice. For example, a police officer may be driving down the street when a BOLO is issued for the silver Audi sedan. The officer may be focusing on driving or performing some other activity/task and may not see the item of interest, in this case the disclosed systems can alert multiple officers to be aware of the potential object of interest and thereby improve the chances for detection. This can also increase safety and efficiency for the officer. Officer efficiency may also be improved with embodiments wherein the camera device and detection/analytics engine are configured to detect expired vehicle tags. Once the analytics engine makes such a determination, the microprocessor can trigger an action as described above (e.g., flash an alert on the vehicle display, issue a notice to the police station 14, record the information as metadata, etc.). Moreover, the disclosed embodiments provide the means to perform the described detection and analytics techniques in real-time, as image data is being captured.

Figure 6:
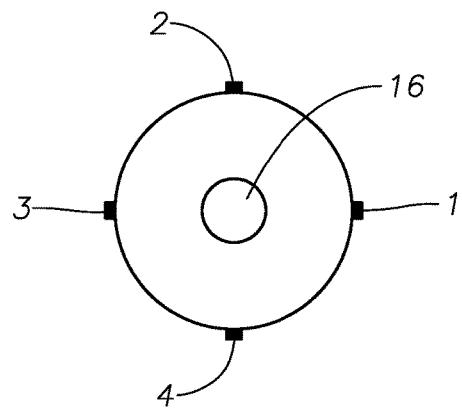
FIG. 6, in accordance with some embodiments of the present disclosure, depicts a top view of a device that may be installed on top of a police vehicle, featuring at least one 360-degree spherical camera.
Figure 7:
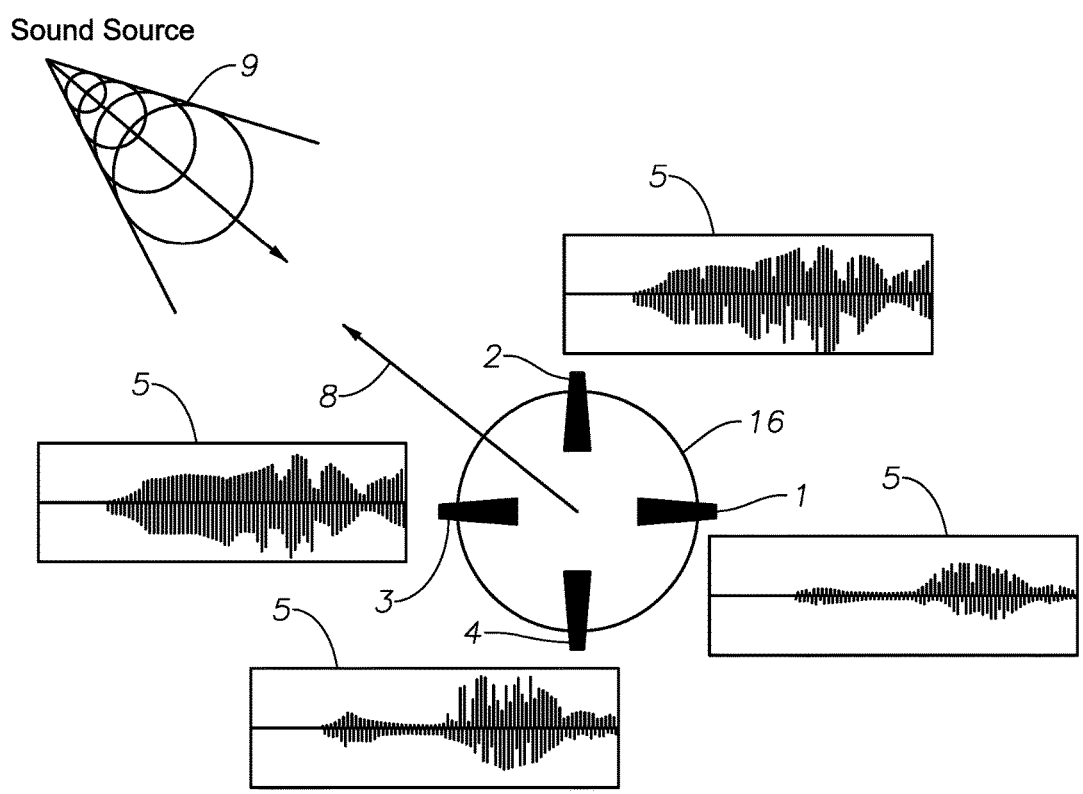
FIG. 7, in accordance with some embodiments of the present disclosure, depicts a bottom view of the device of FIG. 6, receiving sound data, and various pictorial depictions of sound data that may be collected.
Figure 8:
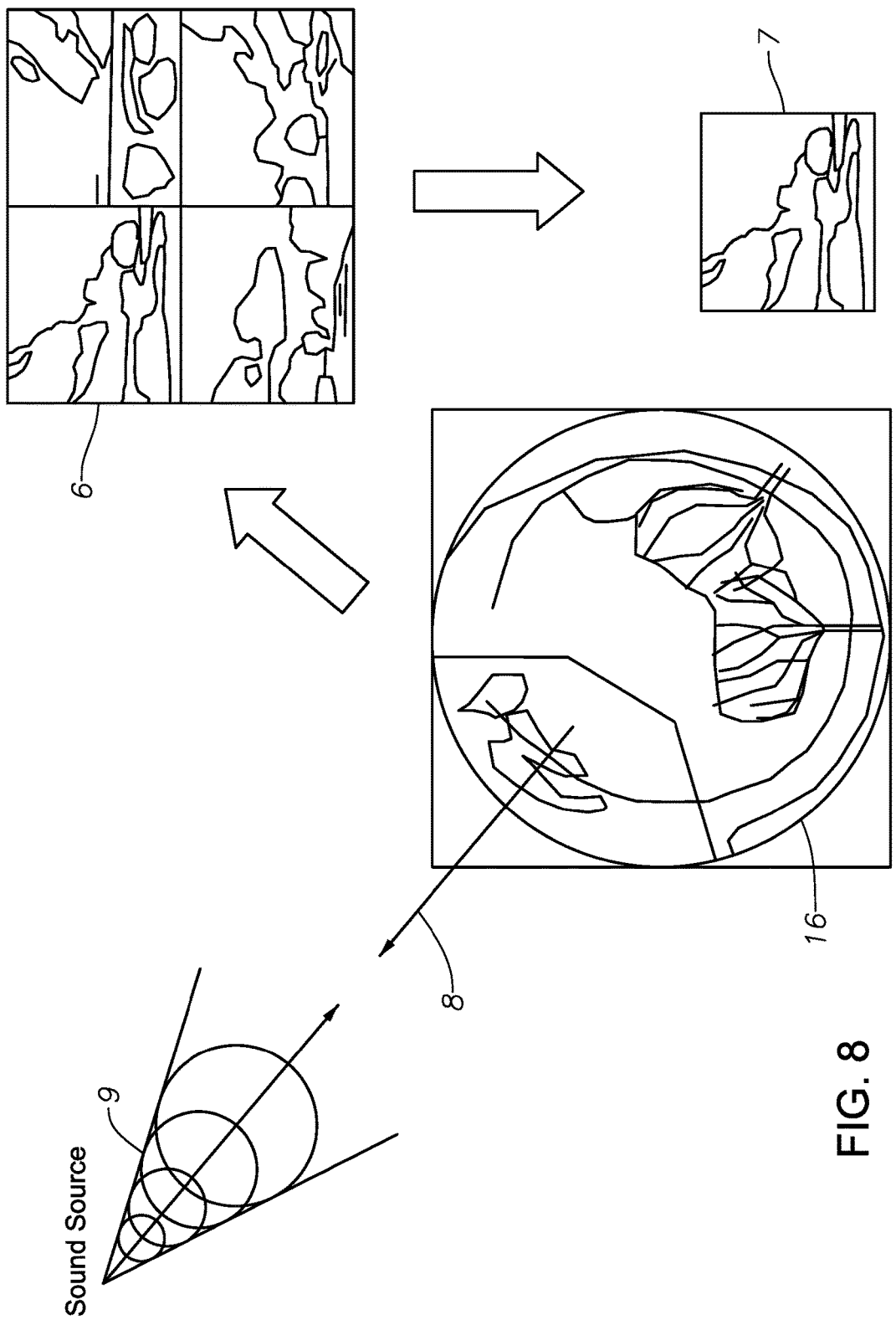
FIG. 8, in accordance with some embodiments of the present disclosure, depicts the transfer of video and pictorial data from the spherical camera of the device of FIG. 6, including the receiving of video/pictorial data, and various exemplary depictions of visual data that may be collected and subsequently isolated.
Figure 9:
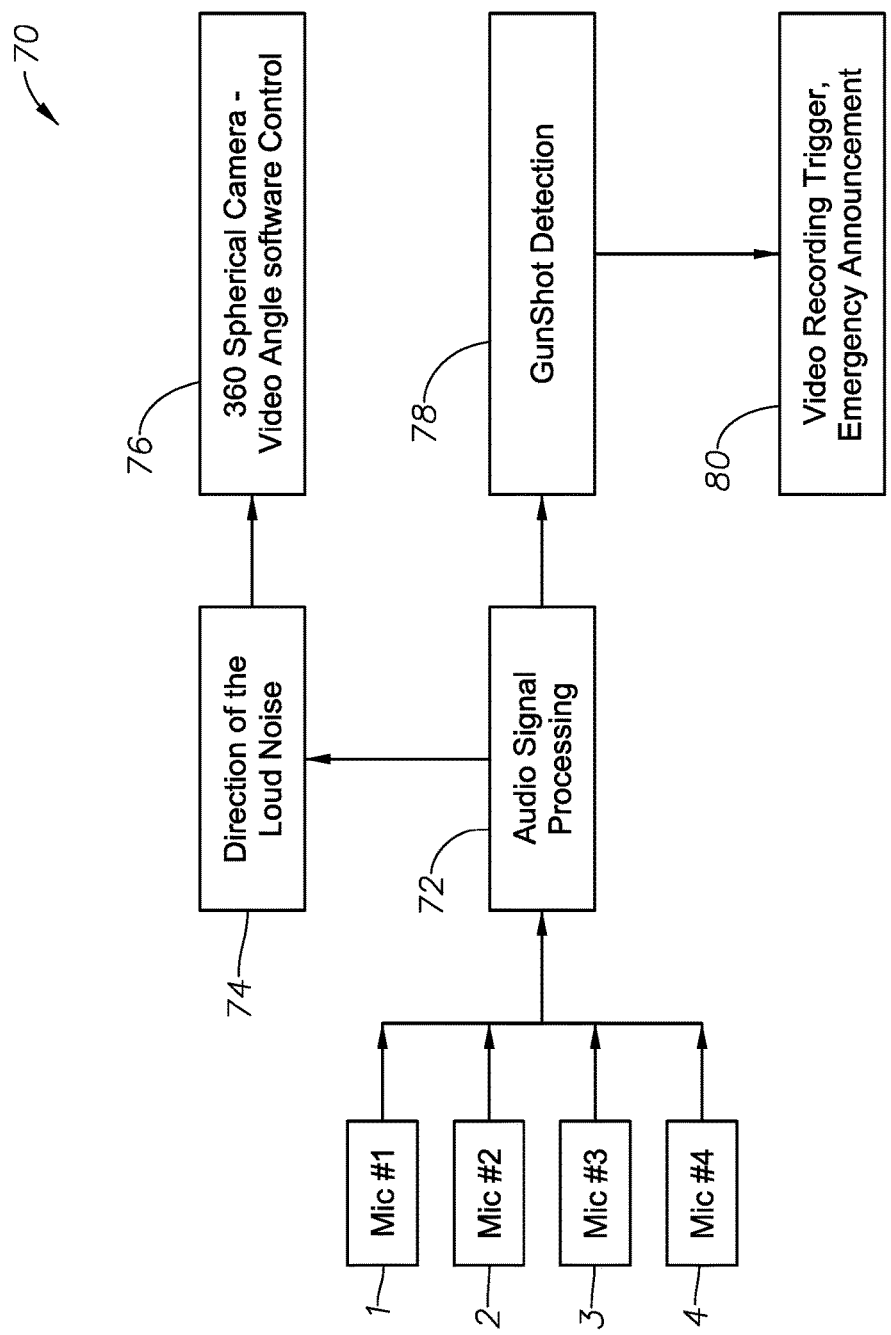
FIG. 9, in accordance with some embodiments of the present disclosure, is a flow schematic of sound data that may be collected from one or more microphones, that is subsequently processed (audio signal processing) to isolate parameters of interest (for example, direction of a loud noise or gunshot detection), and subsequent related action(s) e.g. video recording trigger/emergency announcement in response to gunshot detection or changes to a 360-degree spherical camera via video angle software in order to determine the direction of a loud noise.

Turning to FIG. 6, an overhead view of a camera device 16 comprising a spherical camera that may be used with implementations of this disclosure is depicted. The camera device 16 is configured for roof-mounting on a vehicle 10 and provides a 360-degree view. FIG. 7 depicts the bottom view of the spherical camera device 16, showing (more fully than in FIG. 6) a series of directional microphones (1-4). With the directional microphones (1-4), the approximate direction 8 of sounds emanating from a sound source 9 can be detected. With the combined camera/microphone unit 16, the computer 12 microprocessor can be configured to automatically mark points in the captured video data at which specific sounds 5 are detected (as depicted in FIG. 7) and take snapshots 6 and/or create a video event clip 7 of a predetermined length pre- and post-event (as depicted in FIG. 8). In some embodiments, the camera device 16 may be configured to continually record captured video data in a circular or "failsafe" buffer that can be flushed or transferred for storage to memory. FIG. 9 depicts a schematic flow chart 70 of a spherical camera device 16 as used in combination with the microphones (1-4) to capture and process the detection of gun shots. At step 72, the audio data captured by the microphones (1-4) is processed to determine the approximate direction of the sound source 74. At step 76, the spherical camera device 16 software control adjusts the camera to capture image data in the approximate direction of the sound source. If the audio processing determines that the sound source was a gunshot 78, a gunshot detection signal is sent to trigger the camera device(s) 16 to start recording and an emergency announcement, or actionable notification, or request, is sent via the communication network to the police station 14 or to other nearby devices (step 80). Other embodiments of this disclosure may be implemented with other types of camera devices 16 besides a spherical camera (e.g., using a conventional multi-image sensor camera), to provide the desired image clarity and depth of field. The embodiments of this disclosure may be implemented to incorporate in the described recognition analytics any conventional or future developed sensors providing other types of data besides image/video/audio data (e.g. distance measuring sensors, etc.).

Figure 10:
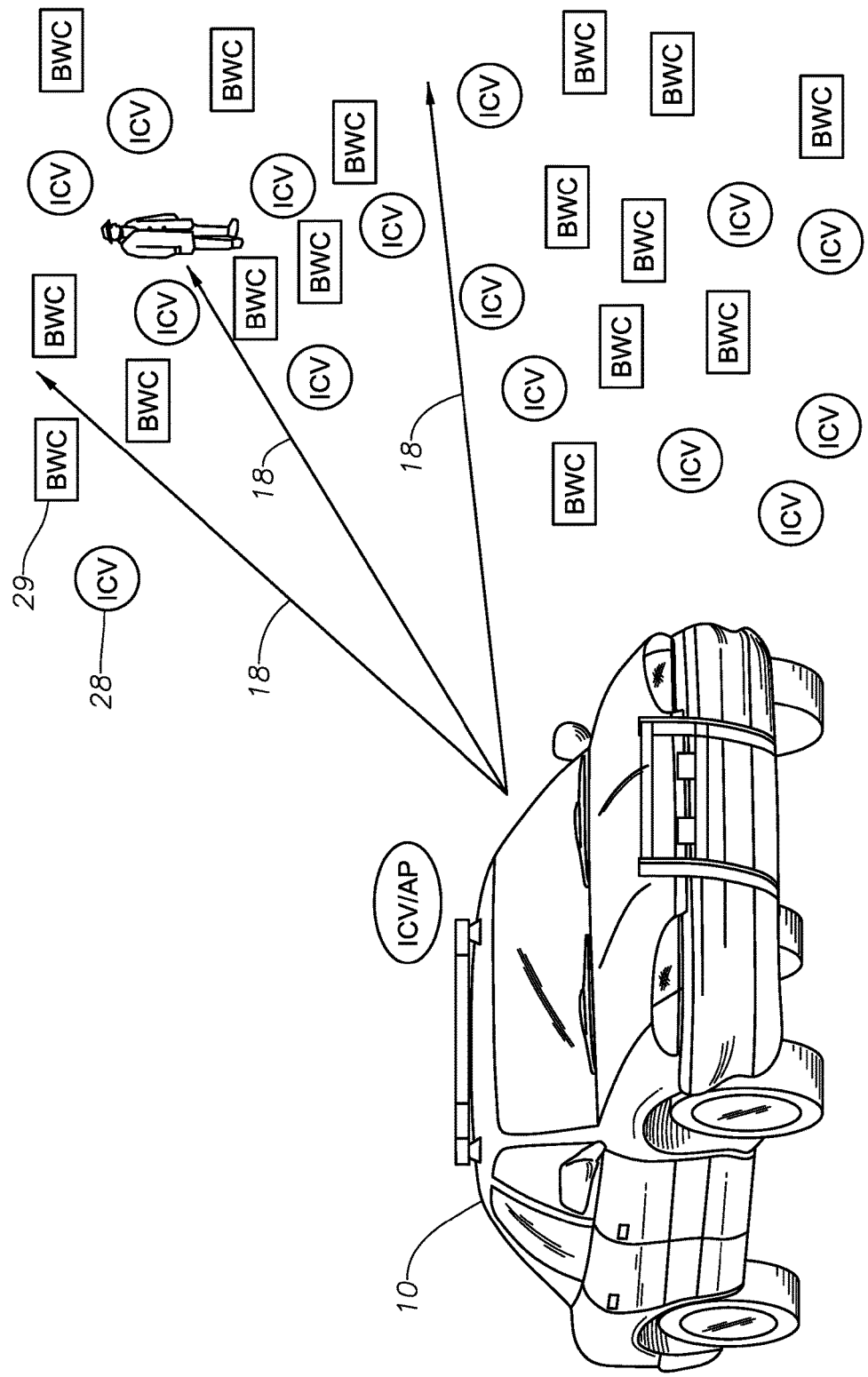
FIG. 10, in accordance with some embodiments of the present disclosure, depicts data flow, specifically video data flow/exchange between a police vehicle with In Car Video (ICV) and Access Point (AP), that is further remotely controlling and exchanging information with various Body Worn Cameras (BWC) and other ICV units in other vehicles.

In some embodiments, the vehicle 10 computer 12 microprocessor may also be configured with instructions to send out a communication (via the communication network 18) to activate the camera devices 16 in other law enforcement vehicles (e.g., in-car video (ICV) units 28), and the BWCs 29 worn by officers, within a set range or perimeter of where the object of interest (corresponding to the designated content) was detected, as depicted by the arrows in FIG. 10. With this embodiment, all the law enforcement vehicles with camera devices 16 and officers with BWCs 29 on the street within the set range or perimeter are turned into scanners, all activated to search for and capture image data relating to the designated content or object of interest. Other embodiments entail the use of an autonomous vehicle 10 to scan the scene for the object attributes in a received communication (e.g. a BOLO alert) and to send a notification to officers nearby and/or to a police dispatch center. The vehicle 10 can track the detected vehicle or person providing real-time or historical location data updates to the officers responding and/or to a police dispatch center. This could help the officers more accurately pursue the vehicle or person of interest.

As previously mentioned, BWCs can be used with implementations of the embodiments of this disclosure. Suitable BWCs include the devices commercially available from COBAN Technologies Inc., in Houston, Tex. (http//www.cobantech.com). The BWCs are worn by officers on patrol. The BWC can be conveniently clipped to the officer's uniform or body gear as desired. BWCs may also be configured with a microphone to collect audio data. The collected audio data may be transmitted together with the captured image/video and/or metadata to another device (e.g., located in a police car, at a police station, on another police officer, or in the cloud) as described herein. It will be appreciated by those skilled in the art that various conventional BWC devices and storage units may be used to implement embodiments of this disclosure. Similarly, various wireless technologies may also be used to implement the embodiments as known in the art. It will also be appreciated that as technology improves, smaller and lower power camera and transmission devices may become available which may further improve performance and run time. Such devices may easily be integrated into the embodiments of this disclosure.

In some embodiments, the vehicle 10 computer 12 may be configured to perform wireless networked or distributed analytics processing. As previously described, in some embodiments the vehicle 10 computer 12 is configured to access an onboard database and perform the disclosed analytics processing as a stand-alone unit. In other embodiments, the vehicle 10 computer 12 may be configured to communicate via the communication network 18 (e.g. using the cloud) with other computers (e.g. remote ICV units 28 and BWCs 29) to perform a distributed and shared image data analysis. With reference to FIG. 10, the vehicle 10 computer 12 microprocessor may issue a communication to the ICV units 28 in police vehicles and BWCs 29 within a set range, to not only activate the respective camera devices, but also including selected image data information to activate the remote devices to perform a local analysis. For example, if an alert is received by the vehicle 10 computer 12 describing a crime involving suspects in multiple vehicles and the computer detects one of the vehicles, the microprocessor sends a communication (in real-time) to all other units/officers within the set range, including the captured image data or components of the captured image data (e.g. metadata alone; each of video data, audio data, and metadata is considered a component of the captured image data). The ICVs 28 and BWCs 29 receiving the information can then focus on scanning to detect for the other vehicles described in the alert. Similarly, image data captured by the ICVs 28 and BWCs 29 can be relayed back to the vehicle 10 computer 12 via the communication network 18 for hubbed real-time processing. In this manner, the ICVs 28 and BWCs 29 are used to form a virtual net providing real-time processing and communication. The communication network 18 (e.g. the cloud) provides a relay data point for all ICVs 28, BWCs 29, vehicles 10, and any other wirelessly linked devices or systems in the vicinity where events of interest are occurring, as well as a relay data point to or from remote locations. This network provides for vehicle-to-vehicle and system-to-system distributed communications. The communication loop in such embodiments may also include the police station, dispatch headquarters, and other law enforcement agencies.

In some embodiments, the ICV 28 is configured to detect and take snapshots, or receive snapshots from a wearable device (e.g. BWC 29), of a person's face to run facial recognition locally or by transmitting the data to a remote server (e.g. server 15) for further analytics. This further enhances the BOLO capabilities. For example, a BOLO may include an alert to look for a white male, wearing a black jacket, having an age in the mid-twenties, etc. The detection of attributes is also enhanced, such as detection of approximate age, gender, and race. The use of AI software and other advanced software applications may provide additional benefits. Some embodiments may also be configured to receive video data via transmission such as Real Time Streaming Protocol (RTSP) streaming for detection and analytics of attributes and facial recognition. Some embodiments of this disclosure provide for selective search and export of the captured information. In one such embodiment, an authorized user linked to the computer 12 microprocessor via the communication network 18 (e.g., using a smart phone, laptop computer, tablet, etc.) can analyze the information according to specific criteria established by the user. For example, a user can select or draw an area on a map to display vehicles in a given region, along with their associated data such as specific location data/time/number of recorded events/event type/duration, license plate data, vehicle type, shape, color etc. If an event or specific data is of interest, the user can select an option to send a request to any or all vehicle computers 12 to scan their storage drives, that are continuously recording, for the desired information and send back a response with the search results or to retrieve the designated data with time markers of start and stop points to export video, snapshots, or metadata. This embodiment can be implemented for a local or global application.

Figure 11:
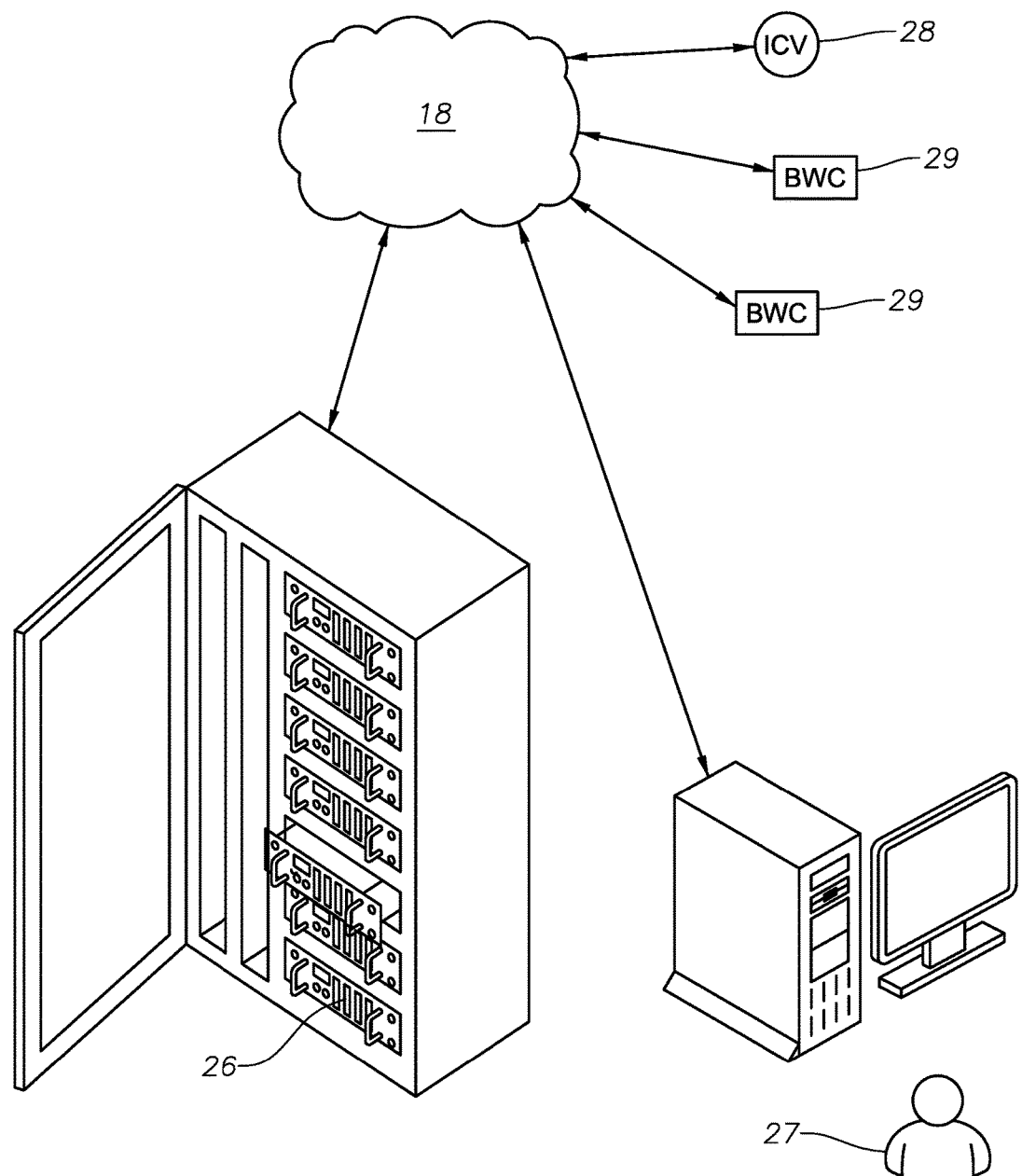
FIG. 11, in accordance with some embodiments of the present disclosure, depicts a Global Data Access System configuration.

FIG. 11 depicts another embodiment of this disclosure. A computer server 26 is linked to one or more camera devices 16 (e.g. ICV units 28 and BWCs 29) via the communication network 18. Some embodiments may also incorporate fixed camera devices 16 (e.g. cameras on buildings, light poles, etc.). This embodiment provides for shared Global Data Access and distribution, allowing authorized users 27 to access the server 26 via the communication network 18. With this embodiment, the server 26 provides a centralized repository for the specific data and information of interest to a user group (e.g. law enforcement agencies). Using such a globally shared server, authorized users 27 can send data of interest to the server 26 for storage (e.g., in local memory or linked data storage). In some embodiments, the server 26 may be partially or entirely implemented as a virtual server in the cloud. Such cloud computing embodiments offer flexibility of scalability. The server 26 is also configured to analyze the data sent to it (encompassing audio, video, metadata, and/or any other available telemetry) by an authorized user in the group, or captured by the linked mobile device(s) 16, to analyze and search for the presence of designated content and designated attributes in the data, as described herein. The server 26 may also be configured to perform full or partial analytics on the captured image data and the data sent by authorized users. The data stored in the server 26 could remain available for a defined period to allow authorized users access to the data. For example, if a BOLO alert is issued an application on the server 26 can scan the stored data (including stored metadata) and if an attribute of interest is detected the application can generate a request to be sent to the linked camera device 16 that captured the detected image data to mark configurable in (start) and out (stop) points of the recorded video, audio, metadata, etc. The marked image data can also be exported and/or uploaded or a live stream can be started if the camera device is still near the location where it originally captured the data. If high importance image data is detected, the server 26 can send alerts or emails to users of the Global Data Access System. For example, if an agency (police department, FBI, DEA, ATF, etc.) is looking for a vehicle having a specific color and make or license plate, an authorized user can enter this information as designated content/attributes in to the Global Data Access System server 26 (e.g., using a smartphone, desktop computer, laptop computer, or tablet device). The server 26 then sends a command, via the communication network 18, to any linked camera device 16 to analyze its recorded image data to search for matching audio, video, and/or metadata, as the case may be. If a match or near match is found, the device that found the match or near match notifies the server 26, and the detected matching or near matching image data, or components thereof (e.g. metadata), are then uploaded and saved (e.g. to local memory) by the server 26. In some embodiments, the server 26 may also be configured to send a notice (e.g. via email) to the searching agency or others, regarding the detected data. In some embodiments, the server 26 may be configured to perform the image data analysis on real-time image data being collected by any linked camera devices. The server 26 may also be configured to analyze the data stored in memory and/or captured by the camera device(s) 16 according to criteria established by an authorized user 27 having access to the server 26 via the communication network 18 (e.g. in response to a BOLO alert).

Figure 12:
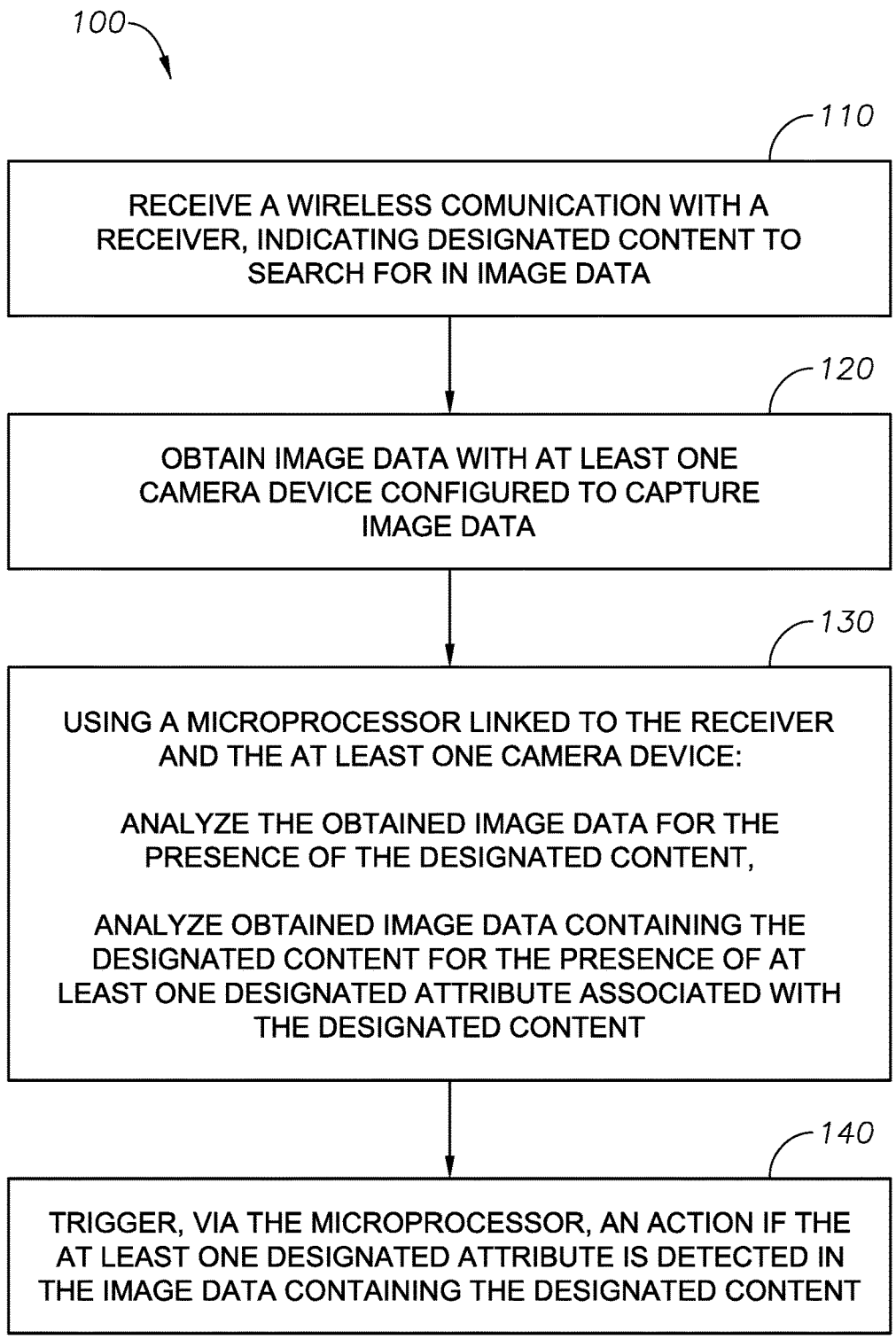
FIG. 12, in accordance with some embodiments of the present disclosure, is a flow chart depicting, at a top level, a method for triggering an action in response to capture and characterization of image data.

FIG. 12 is a flow chart depicting a method 100 according to an embodiment of this disclosure. At step 110, a wireless communication is received with a receiver, indicating designated content to search for in image data. The communication may be conveyed via the communication network 18. At step 120, image data is obtained using at least one camera device 16 (e.g., ICV 28, BWC 29) configured to capture image data. At step 130, using a microprocessor linked to the receiver and the at least one camera device, (a) the obtained image data is analyzed to determine if it contains the designated content and (b) obtained image data containing the designated content is analyzed to determine if it contains at least one designated attribute associated with the designated content. This may be implemented using an analytics engine and processing as described herein. At step 140, an action is triggered by the microprocessor if the at least one designated attribute is detected in the obtained image data containing the designated content. This entails any of the actions that may be triggered by the microprocessor as described herein.

Figure 13:
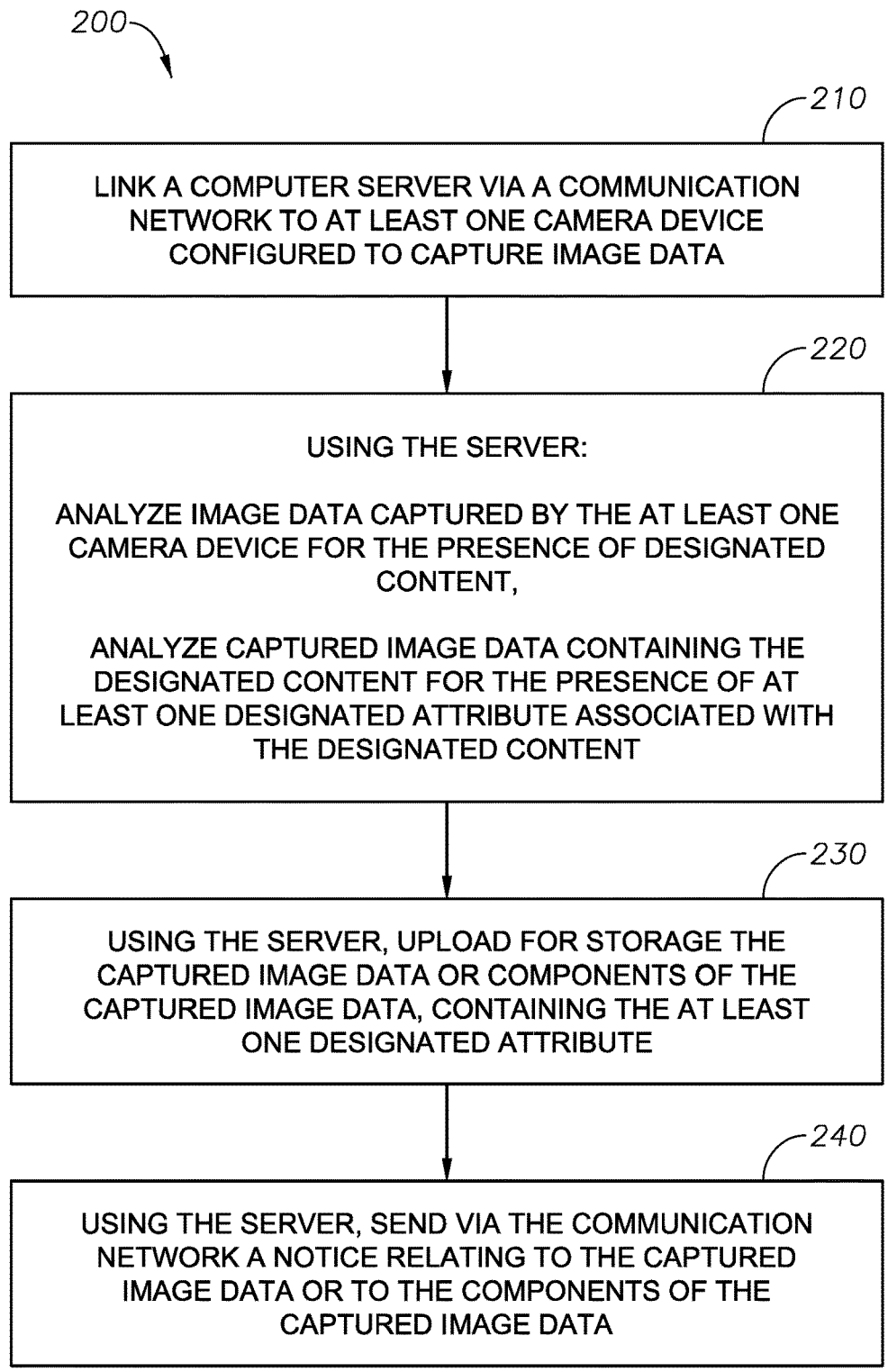
FIG. 13, in accordance with some embodiments of the present disclosure, is a flow chart depicting, at a top level, another method for triggering an action in response to capture and characterization of image data.

FIG. 13 is a flow chart depicting a method 200 according to an embodiment of this disclosure. At step 210, a computer server is linked via a communication network to at least one camera device 16 (e.g., ICVs 28, BWCs 29) configured to capture image data. At step 220, using the server, (a) image data captured by the at least one camera device is analyzed for the presence of designated content and (b) captured image data containing the designated content is analyzed for the presence of at least one designated attribute associated with the designated content. This may be implemented using an analytics engine and processing as described herein. At step 230, using the server, the captured image data or components of the captured image data, containing the at least one designated attribute, are uploaded for storage. At step 240, using the server, a notice relating to the captured image data or to the components of the captured image data, is sent via the communication network.

In light of the principles and example embodiments described and depicted herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method, comprising:
   receiving a wireless communication with a receiver, the communication indicating designated content to search for in image data;
   upon receipt of the communication indicating the designated content, obtaining image data using at least one camera device configured to capture image data;
   using a microprocessor linked to the receiver and the at least one camera device, (a) analyzing the obtained image data for a presence of the designated content and (b) analyzing obtained image data containing the designated content for a presence of at least one designated attribute associated with the designated content;
   using the microprocessor, calculating a confidence level indicating a level of confidence that the obtained image data containing the designated content includes the at least one designated attribute associated with the designated content;
   using the microprocessor, comparing the confidence level with a first criterion; and
   triggering an action by the microprocessor if the at least one designated attribute is detected in the obtained image data containing the designated content;
   wherein the analyzing of the obtained image data for the presence of the designated content comprises classifying captured images of unknown objects;
   wherein the triggering of the action is contingent upon the confidence level meeting or exceeding the first criterion; and
   wherein the receiver, the microprocessor, and the at least one camera device are housed in one or more edge devices.

2. The method of claim 1, wherein the designated content comprises at least one of: (i) a geographical parameter, (ii) location data, (iii) a vehicle type, (iv) a vehicle make, (v) a color, (vi) a license plate character, (vii) a shape, (viii) an object, or (ix) a person.

3. The method of claim 1, further comprising using the microprocessor, analyzing the obtained image data according to a second criterion established by a user.

4. The method of claim 1, wherein the triggering the action comprises at least one of: (i) providing an alert, (ii) displaying an image of the designated content on a display, (iii) activating a device configured to record image and/or metadata, (iv) communicating information relating to the designated content, (v) activating a hardware function, (vi) activating a software function, (vii) extracting and storing content of the obtained image data containing the designated content, or (viii) production of a text file.

5. The method of claim 1, wherein the communication indicating the designated content to search for in the image data comprises a communication from the group consisting of: (i) a BOLO alert, (ii) an Amber alert, and (iii) a Silver alert.

6. The method of claim 1, wherein the at least one camera device comprises a wearable camera device, and the microprocessor is disposed in a vehicle.

7. The method of claim 1, further comprising activating multiple camera devices configured to capture image data upon receipt of the communication indicating the designated content to search for in the image data.

8. A method, comprising:
   linking a computer via a communication network to at least one camera device configured to capture image data;
   using the computer, (a) analyzing image data captured by the at least one camera device for a presence of designated content and (b) analyzing captured image data containing the designated content for a presence of at least one designated attribute associated with the designated content;

using the computer, calculating a confidence level indicating a level of confidence that the captured image data containing the designated content includes the at least one designated attribute associated with the designated content;

using the computer, comparing the confidence level with a first criterion;

using the computer, uploading for storage the captured image data or components of the captured image data, containing the at least one designated attribute; and using the computer, sending via the communication network a notice relating to the captured image data or to the components of the captured image data;

wherein the analyzing of the image data captured by the at least one camera device for the presence of designated content comprises classifying captured images of unknown objects;

wherein sending the notice relating to the captured image data or to the components of the captured image data, is contingent upon the confidence level meeting or exceeding the first criterion; and wherein the at least one camera device is an edge device, and the computer is either an edge device or a device remote from the at least one camera device.

9. The method of claim 8, wherein the designated content comprises at least one of: (i) a geographical parameter, (ii) location data, (iii) a vehicle type, (iv) a vehicle make, (v) a color, (vi) a license plate character, (vii) a shape, (viii) an object, or (ix) a person.

10. The method of claim 8, wherein the analyzing the image data captured by the at least one camera device comprises analyzing data in real-time.

11. The method of claim 8, wherein the analyzing the image data captured by the at least one camera device comprises analyzing image data saved in memory.

12. The method of claim 8, further comprising using the computer to analyze the image data captured by the at least one camera device according to a second criterion established by a user having access to the computer via the communication network.

13. The method of claim 8, wherein the computer is configured to analyze the image data captured by the at least one camera device based on a communication from the group consisting of: (i) a BOLO alert, (ii) an Amber alert, and (iii) a Silver alert.

14. A system, comprising:
a receiver configured to receive wireless communications;
at least one camera device configured to capture image data upon receipt by the receiver of a communication indicating designated content to search for in image data; and
a microprocessor linked to the receiver and the at least one camera device,
wherein the receiver, the microprocessor, and the at least one camera device are housed in one or more edge devices;
wherein the microprocessor is configured with instructions to (a) analyze image data captured by the at least one camera device for a presence of the designated content and (b) analyze captured image data containing the designated content for a presence of at least one designated attribute associated with the designated content;
wherein the microprocessor is configured with instructions to (c) calculate a confidence level indicating a level of confidence that the captured image data containing the designated content includes the at least one designated attribute associated with the designated content, and (d) compare the confidence level with a first criterion;
wherein the microprocessor is configured with instructions to trigger an action if the at least one designated attribute is detected in the captured image data containing the designated content;
wherein the analyzing of the captured image data for the presence of the designated content comprises classifying captured images of unknown objects; and
wherein the triggering of the action is contingent upon the confidence level meeting or exceeding the first criterion.

15. The system of claim 14, wherein the designated content comprises at least one of: (i) a geographical parameter, (ii) location data, (iii) a vehicle type, (iv) a vehicle make, (v) a color, (vi) a license plate character, (vii) a shape, (viii) an object, or (ix) a person.

16. The system of claim 14, wherein the microprocessor is configured with instructions to analyze the image data captured by the at least one camera device according to a second criterion established by a user.

17. The system of claim 14, wherein the action to be triggered comprises at least one of: (i) providing an alert, (ii) displaying an image of the designated content on a display, (iii) activating a device configured to record image data, (iv) communicating information relating to the designated content determined present in the image data, (v) activating a hardware function, (vi) activating a software function, (vii) extracting and storing content of the captured image data containing the designated content, and (viii) producing a text file.

18. The system of claim 14, wherein the at least one camera device comprises a wearable camera device, and the microprocessor is disposed in a vehicle.

19. The system of claim 14, wherein the microprocessor is configured with instructions to activate multiple camera devices configured to capture image data, and to analyze the image data captured by the multiple camera devices for the presence of the designated content in the image data.

20. The system of claim 14, wherein the communication indicating the designated content to search for in the image data comprises a communication from the group consisting of: (i) a BOLO alert, (ii) an Amber alert, and (iii) a Silver alert.

21. A system, comprising:
at least one camera device configured to capture image data; and
a computer linked to the at least one camera device via a communication network;
wherein the computer is configured with instructions to (a) analyze image data captured by the at least one camera device for a presence of designated content, (b) analyze captured image data containing the designated content for a presence of at least one designated attribute associated with the designated content, (c) calculate a confidence level indicating a level of confidence that the captured image data containing the designated content includes the at least one designated attribute associated with the designated content, (d) compare the confidence level with a first criterion;

wherein the computer is configured with instructions to upload for storage the captured image data or components of the captured image data, containing the at least one designated attribute;

wherein the computer is configured with instructions to classify captured image data of unknown objects;

wherein, contingent on the confidence level meeting or exceeding the first criterion, the computer is configured with instructions to send via the communication network a notice relating to the captured image data or to the components of the captured image data; and wherein the at least one camera device is an edge device, and the computer is either an edge device or a device remote from the at least one camera device.

22. The system of claim 21, wherein the designated content comprises at least one of: (i) a geographical parameter, (ii) location data, (iii) a vehicle type, (iv) a vehicle make, (v) a color, (vi) a license plate character, (vii) a shape, (viii) an object, or (ix) a person.

23. The system of claim 21, wherein the analysis of the image data captured by the at least one camera device comprises (i) analysis of data in real-time or (ii) analysis of data saved in memory.

24. The system of claim 21, wherein the computer is configured with instructions to analyze the image data captured by the at least one camera device according to a second criterion established by a user having access to the computer via the communication network.

25. The system of claim 21, wherein the computer is configured for permitting global access to and distribution of the captured image data via the communication network.

26. The system of claim 21, wherein the computer is configured to analyze the image data captured by the at least one camera device based on a communication from the group consisting of: (i) a BOLO alert, (ii) an Amber alert, and (iii) a Silver alert.

27. A system, comprising:
a first camera device configured to capture image data;
a first microprocessor linked to the first camera device;
a transmitter linked to the first microprocessor and a communication network;
a second camera device configured to capture image data;
a second microprocessor linked to the second camera device; and
a receiver linked to the second microprocessor and the communication network;
wherein the first microprocessor is configured with instructions to (a) analyze image data captured by the first camera device for a presence of designated content, (b) analyze captured image data containing the designated content for a presence of at least one designated attribute associated with the designated content, and (c) transmit a notification over the communication network to the receiver when the designated content or the at least one designated attribute is detected, the notification comprising an instruction to search image data for the detected designated content or the detected at least one designated attribute;
wherein the second microprocessor is configured with instructions to (a) receive the notification from the first microprocessor and (b) analyze image data captured by the second camera device for the presence of the designated content or the at least one designated attribute; and
wherein the first microprocessor and the second microprocessor are housed in distinct edge devices.

* * * * *